United States Patent Office
3,412,107
Patented Nov. 19, 1968

3,412,107
11-HYDROXY-5-OXO-3,5-SECO-A-NOR-ANDRO-
STAN-3-OIC ACID 3,11-LACTONES
Milan Radoje Uskokovic, Upper Montclair, and Thomas
Henry Williams, Passaic, N.J., assignors to Hoffmann-
La Roche Inc., Nutley, N.J., a corporation of New
Jersey
No Drawing. Filed Sept. 29, 1964, Ser. No. 400,206
1 Claim. (Cl. 260—340.9)

ABSTRACT OF THE DISCLOSURE

11 - hydroxy-5-oxo-3,5-seco-A-nor-androstan-3-oic acid, 3,11-lactones of the formula

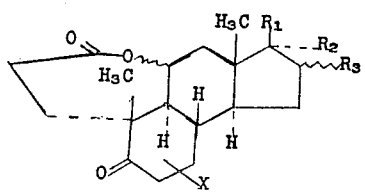

wherein $R_1$ is, individually, selected from the group consisting of hydroxy and lower alkanoyloxy; $R_2$ is, individually, lower alkyl and $R_1$ and $R_2$ taken together are selected from the group consisting of (17β-OH, 17-lower alkanoic acid lactone) and lower alkylene dioxy; $R_3$ is selected from the group consisting of hydrogen, lower alkyl, hydroxy, and lower alkanoyloxy; and X is a substituent in the 6- or 7-position selected from the group consisting of hydrogen, lower alkyl, lower alkylthio, lower alkanoylthio and halogen. The compounds are intermediates which can be converted to 9β,10α-steroids which are pharmaceutically useful as anabolic agents.

This invention relates to novel chemical intermediates and processes useful in the preparation of steroids. Natural steroids possess a 9α,10β-stereochemical configuration. Steroidal compounds possessing the unnatural 9β,10α-configuration represent a pharmaceutically valuable class of compounds which, even though numerous members are known in the art, cannot be obtained by totally classical chemical means. In fact, the only known methods for obtaining steroids possessing the unnatural 9β,10α-configuration involve at least one photochemical reaction. Such photochemical reactions involve irradiation with ultraviolet light of strong intensity for long periods of time and, in comparison with purely chemical reactions, are very inefficient and give only small yields.

It is an object of the present invention to provide intermediates and processes which enable the preparation of 9β,10α - steroids without the necessity of proceeding through a photochemical reaction. It is also an object of this invention to provide novel intermediates and processes which will enable the further exploration of steroids having the unnatural 9β,10α-configuration. It is also an object of this invention to provide novel 9β,10α-steroids.

The novel intermediates and processes of this invention are valuable and provide a new synthetic route completely of a classical chemical nature, i.e. involving no photochemical reaction for converting steroids having the normal configuration into steroidal compounds possessing the unnatural 9β,10α-configuration.

In one aspect, the novel intermediates and processes of this invention enable the preparation of 9β,10α-steroids of the androstane series of the formula

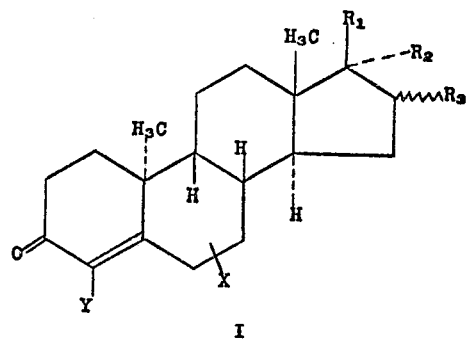

I wherein $R_1$ is, individually, selected from the group consisting of hydroxy and lower alkanoyloxy; $R_2$ is, individually, lower alkyl and $R_1$ and $R_2$, taken together, are selected from the group consisting of (17β-OH, 17α-lower alkanoic acid lactone) and oxo; $R_3$ is selected from the group consisting of hydrogen, lower alkyl, hydroxy and lower alkanoyloxy; Y is selected from the group consisting of hydrogen and lower alkyl and X is a substituent in the 6- or 7-position selected from the group consisting of hydrogen, lower alkyl, lower alkylthio, lower alkanoylthio and halogen.

Compounds of Formula I are useful as anabolic agents.

Other 9β,10α-androstanes, the preparation of which is enabled by the intermediates and processes of this invention, are of the formulae

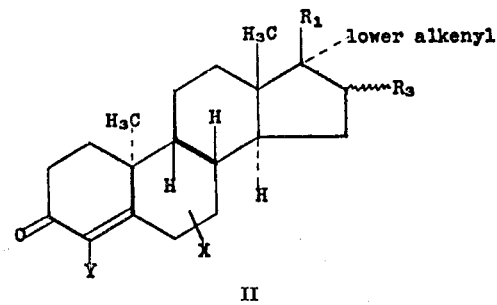

II

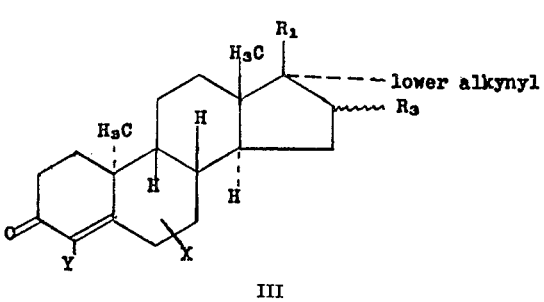

III wherein $R_1$, $R_3$, Y and X have the same meaning as above. Compounds of Formula III are useful as progestational agents and compounds of Formula II are useful as anti-androgenic agents.

In another embodiment of this invention, the novel compounds and intermediates provided by this invention enable the preparation of 9β,10α-steroids of the 17β-pregnane series of the formula

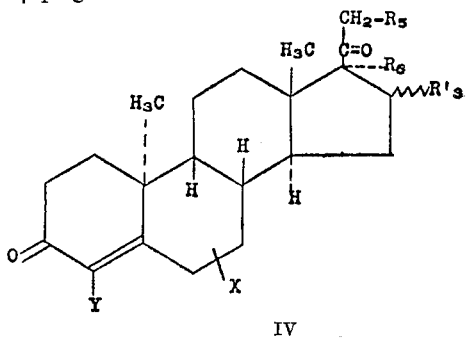

IV wherein Y and X have the same meaning as above; R′₃ is selected from the group consisting of hydrogen, lower alkyl, fluoro, hydroxy and lower alkanoyloxy; R₅ is selected from the group consisting of hydrogen and halogen; and R₆ is selected from the group consisting of hydrogen, lower alkyl, hydroxy and halogen.

Compounds of Formula IV are useful as progestational agents.

Other 9β,10α-steroids of the 17β-pregnane series, preparable from the novel compounds and process of this invention, are of the formula

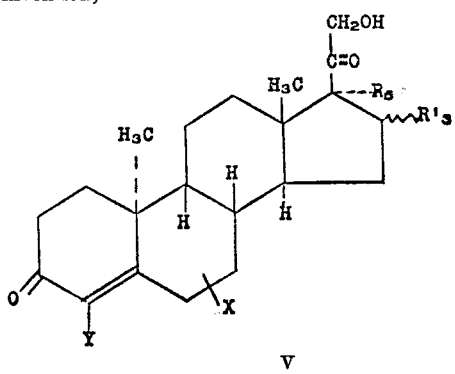

V wherein R′₃, R₆, Y and X have the same meaning as above.

Compounds of Formula V are useful as salt-retaining agents, i.e. are useful in the treatment of Addison's disease.

As used herein, the term lower alkyl comprehends both straight and branched chain saturated hydrocarbon groups, such as methyl, ethyl, propyl, isopropyl and the like. Similarly, the term lower alkanoyl comprehends groups such as acetyl and the like, and the term lower alkanoyloxy comprehends groups such as acetoxy and the like. In the same manner, the term lower alkenyl comprehends groups such as vinyl and the like, and the term lower alkynyl comprehends groups such as ethinyl and the like. Halogen comprehends all four halogens, i.e, iodine, bromine, chlorine and fluorine.

The expression "(17β-OH, 17α-lower alkanoic acid lactone)" refers to a configuration on the C–17 carbon atom illustrated as follows:

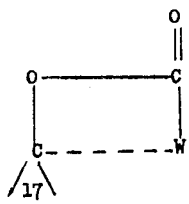

wherein W is lower alkylene, e.g. polymethylenes such as ethylene, propylene or the like.

With respect to substituents in the 6- and 7-position, preferred compounds are those having hydrogen or lower alkyl in 6- or 7-position, and those having halogen in the 7-position.

In one aspect, this invention comprises a method for the preparation of 9β,10α-androstanes of Formulae I–III and of 9β,10α-17β-pregnanes of Formulae IV–V which comprises the hydrogenation of desA-androst-9-en-5-ones or of desA-17β-pregn-9-en-5-ones to 9β,10β-desA-androstan - 5 - ones or 9β,10β - desA - 17β - pregnan - 5-ones, respectively, followed by condensation with a lower alkyl vinyl ketone with methyl or ethyl vinyl ketone preferred (as well as substitutes therefor such as 1-dialkyl amino-3-butanone, 1-dialkyl amino-3-pentanone and quaternary ammonium salts thereof), 1-bromobutan-3-one, 1-bromobutan-3-one lower alkylene ketal, 1-bromo-butan-3-ol, esterified 1-bromo-butan-3-ol, 1-bromobutan-3-ol-ether, 1,3-dichlorobut-2-ene, 1,3-dichloropent-2-ene, 1-bromopentan-3-one, 1-bromopentan-3-one lower alkylene ketal, 1-bromopentan-3-ol, esterfied 1-bromopentan-3-ol or 1-bromopentan-3-ol-ether, which condensation yields the desired 9β,10α-steroids. This invention also provides a number of different methods for the preparation of said desA-androst-9-en-5-one or desA-17β-pregn-9-en-5-one starting materials from natural steroids.

In one embodiment, a steroid of the 3-oxo-androst-4-ene or 3-oxo-17β-pregn-4-ene series is subjected to an oxidative ring opening of the A-ring yielding a 5-oxo-3, 5-seco-A-norandrostan-3-oic acid or a 5-oxo-3,5-seco-A-nor-17β-pregnan-3-oic acid, which 3-oic acid can then be converted to a mixture of a 10α-desA-androstan-5-one and a 10β-desA-androstan-5-one or a mixture of a 10α-desA-17β-pregnan-5-one and a 10β-desA-17β-pregnan-5-one. The conversion of the 3-oic acid to the desA-compound can be effected either by pyrolysis of a salt of said 3-oic acid or via the enol lactone, i.e. a 4-oxoandrost-5-en-3-one or a 4-oxo-17β-pregn-5-en-3-one, which upon reaction with a Grignard reagent gives an aldol, which in turn can be converted into the desired desA-compound. The desA-compound can then be converted into the starting material desA-androst-9-en-5-one or desA-17β-pregn-9-en-5-one via a two-step sequence of halogenation and dehydrohalogenation.

In another embodiment of this invention, desA-androst-9-en-5-one or desA-17β-pregn-9-en-5-one starting materials can be prepared from 11-hydroxy steroids of the 3-oxo-androst-4-ene or 3-oxo-17β-pregn-4-ene series. This can be effected in a variety of ways. In one approach, an 11-hydroxy group of a steroid of the 3-oxo-androst-4-ene or 3-oxo-17β-pregn-4-ene series is converted into a leaving group, for example, a sulfonic acid ester or carboxylic acid ester. Oxidative ring opening of the A-ring of the thus formed 11-(esterified hydroxy)-containing compound yields the corresponding 11-(esterified hydroxy)-5-oxo-3, 5-seco-A-norandrostan-3-oic acid or 11-(esterified hydroxy)-5-oxo-3, 5-seco-A-nor-17β-pregnan-3-oic acid which upon pyrolysis of a salt of said 3-oic acid yields the desired desA-androst-9-en-5-one or desA-17β-pregn-9-en-5-one starting material.

A further approach involves formation of an 11-hydroxy-desA-androstan-5-one or 11 - hydroxy-desA-17β-pregnan-5-one from an 11-hydroxy steroid of the 3-oxo-androst-4-ene or 3-oxo-17β-pregn-4-ene series via an oxidative ring opening of the A-ring of said 11-hydroxy steroid which yields an 11-hydroxy-5-oxo-A-nor-3,5-seco-androstan-3-oic acid 3,11-lactone or an 11-hydroxy-5-oxo-3, 5-seco-17β-pregnan-3-oic acid 3,11-lactone which, in turn is converted into a salt of the corresponding keto acid which salt upon pyrolysis gives the 11-hydroxy-desA-androstan-5-one or 11-hydroxy-desA-17β-pregnan-5-one. Esterification of the 11-hydroxy moiety of the so-obtained compound with an acid moiety yield at 11-(esterified hydroxy)-desA-androstan-5-one or an 11-(esterified hydroxy)-desA-17β-pregnan-5-one which upon elimination of the leaving group (i.e., the esterified hydroxy moiety) gives the desired desA-androst-9-en-5-one or desA-17β-pregn-9-en-5-one starting material. Though, in the above reaction sequence either 11α-OH or 11β-OH starting material steroids can be used, it is preferred to use 11α-OH starting materials.

As will be appreciated from the above discussion, neither the specific reaction steps nor the reaction sequences of this invention involve any modification of substituents found in the 16- and/or 17-position of the starting material natural steroids. However, in order to obtain unnatural 9β,10α-steroids of Formulae I–V, it is necessary or desirable to protect certain of the 16- and/or 17-substituents against one or more of the reaction steps involved. It is also convenient to initially protect such a substituent in the starting material natural steroid and maintain the substituent in its protected form throughout the entire reaction sequence, regenerating the desired substituent only when the steroid of Formulae I–V possessing the unnatural 9β,10α-configuration is obtained. On the other hand, it is sometimes convenient to insert a protecting group only before a certain reaction step or sequence of reaction steps. Said protecting group can then be maintained until the final reaction step or can be split off at some intermediate stage. The protecting groups can be inserted and split off by means know per se. The desirability of having protecting groups present will be further discussed below when the specific reaction steps are discussed in detail. The various substituents which are susceptible to being protected are exemplified by the 16-hydroxy group in a compound of any of Formulas I–V, the 17β-hydroxy group in a compound of any of Formulas I–III, the 17α-hydroxy or 20-oxo group in a compound of any of Formulas IV–V, the 21-hydroxy group of a compound of Formula V or the 17-oxo group of a compound of Formula I.

The 17-oxo or 20-oxo group is suitably protected by ketalization, i.e., by reaction with a lower alkanediol, to yield a 17-lower alkylene dioxy or 20-lower alkylene dioxy compound, i.e., a 17-ketal or a 20-ketal.

The 16-hydroxy, 17α-hydroxy, 17β-hydroxy or 21-hydroxy moieties can be protected by esterification and/or etherification of the hydroxy group. Any available acid which will form an ester that can subsequently be hydrolyzed to regenerate the hydroxy group is suitable. Exemplary acids useful for this purpose are lower alkanoic acids, e.g. acetic acid, caproic acid, benzoic acid, phosphoric acid and lower alkyl discarboxylic acids, e.g. succinic acid. Also, protection for the 16α-hydroxy, 17-α-hydroxy, or 21-hydroxy substituent can be effected by forming the lower alkyl ortho ester thereof, i.e. 16α,17α- or 17α, 21-lower alkyl ortho esters. A suitable ether protecting group is, for example, the tetrahydropyranyl ether.

In compounds containing the dihydroxyacetone side chain at C-17 (for example, compounds of Formula V wherein R₆ is hydroxy), the side chain at C-17 can be protected by forming the 17,20; 20,21-bis-methylenedioxy group or by forming a 17,21-acetal or ketal group, or by forming a 17,21-diester. The 17,21-acetal or ketal and 17, 21-diester hinder the 20-ketone group and minimize the possibility of its participating in unwanted side reactions. On the other hand, the 17,20; 20,21-bis-methylenedioxy derivatives actually convert the ketone to a non-reactive derivative. When both a 16α-hydroxy and 17α-hydroxy substituent are present, these groups can be protected via formation of a 16α,17α-acetal or ketal. The various protecting groups mentioned above can be removed by means known per se, for example, by mild acid hydrolysis.

In compounds wherein there is present neither a 17α-hydroxy nor 21-hydroxy substituent but there is present a 20-oxo group, the 20-oxo group can be protected via reduction to the corresponding carbinol (hydroxy) group. Thus, for example, the 17-acetyl side chain can be protected via conversion to a 17-(α-hydroxy-ethyl)-side chain. Regeneration of the 17-acetyl side chain can be simply effected via conventional oxidation means, for example, via oxidation with chromium trioxide in an organic solvent such as glacial acetic acid. Similarly in compounds containing a 17-oxo, this group can be protected by reduction to the corresponding carbinol (hydroxy) group. Thus, the 17-oxo group can be reduced to a 17β-OH, 17α-H moiety, from which, when desired, the 17-oxo moiety can be regenerated by oxidation, as described above. Furthermore, a 20-hydroxy or 17β-hydroxy group, can itself be protected by esterification, for example, with a lower alkanoic acid such as acetic acid, caproic acid or the like.

The 16α-17α or 17α,21-acetals and ketals above discussed can be formed by reacting 16α,17α-bis-hydroxy or 17α,21-bis-hydroxy starting materials with an aldehyde or a ketone; preferably it is done by reacting a simple acetal or ketal (i.e. a lower alkylene glycol acetal or ketal of a suitable aldehyde or ketone) with the moieties sought to be protected.

Suitable aldehydes and ketones include lower alkanals of at least two carbon atoms, such as paraldehyde, propanal and hexanal; di(lower alkyl)ketones, such as acetone, diethylketone, dibutylketone, methylethylketone, and methylisobutylketone; cycloalkanones, such as cyclobutanone, cyclopentanone and cyclohexanone; cycloalkyl (lower alkanals), such as cyclopentylcarboxaldehyde and cyclohexylcarboxaldehyde; cycloalkyl lower alkyl ketones, such as cyclopentyl propyl ketones, cyclohexylmethyl ethyl ketone; dicycloalkyl ketones, such as dicyclopentyl ketone, dicyclohexyl ketone and cyclopentyl cyclohexyl ketone; cycloalkyl monocyclic aromatic ketones, such as cyclohexyl p-chlorophenyl ketone, cyclopentyl o-methoxyphenyl ketone, cyclopentyl o,p-dihydroxy-phenyl ketone and cyclohexyl m-tolyl ketone; cycloalkyl-lower alkyl monocyclic aromatic ketones, such as cyclopentyl-methyl phenyl ketone; cycloalkyl monocyclic aromatic-lower alkyl ketones, such as cyclopentyl benzyl ketone and cycylohexyl phenethyl ketone; cycloalkyl-lower alkyl monocyclic aromatic-lower alkyl ketones, such as cyclopentylmethyl benzyl ketone; halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g. p-chlorobenzaldehyde and p-fluorobenzaldehyde), lower alkoxy-benzaldehydes (e.g. o-anisaldehyde), di(lower alkoxy)benzaldehydes (e.g. veratraldehyde), hydroxybenzaldehydes (e.g. salicylaldehyde), lower alkyl benzaldehydes (e.g. m-tolualdehyde and p-ethylbenzaldehyde), di(lower alkyl)-benzaldehydes (e.g. o,p-dimethylbenzaldehyde); monocyclic carboxylic aromatic lower alkanals, such as phenylacetaldehyde, α-phenylpropionaldehyde, β-phenylpropionaldehyde, 4-phenylbutyraldehyde, and aromatically-substituted halo, lower alkoxy, hydroxy and lower alkyl cyano derivatives thereof; monocyclic carbocyclic aromatic ketones, such as acetophenone, α,α,α-trifluoroacetophenone, propiophenone, butyrophenone, valerophenone, halophenyl lower alkyl ketones (e.g. p - chloroacetophenone and p - chloropropiohenone); (lower alkoxy) phenyl lower alkyl ketones (e.g. p-anisyl methyl ketone); di-(lower alkoxy) phenyl lower alkyl ketones; hydroxy-phenyl lower alkyl ketones; (lower alkyl) phenyl lower alkyl ketones (e.g. methyl p-tolyl ketones); di(lower alkyl) phenyl lower alkyl ketones (o,p-xylyl methyl ketone; benzophenone, and mono- or bis-substituted halo, lower alkoxy, hydroxy and lower alkyl derivative thereof; monocyclic carbocyclic aromatic lower alkanones, such as 1-phenyl-3-butanone and 1-phenyl-4-pentanone, and aromatically substituted derivatives thereof.

Especially suitable are those aldehydes or ketones which, with the 16α,17α- or 17α,21-bis-hydroxy grouping form an acetal or ketal group of the formula

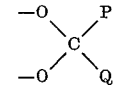

wherein P is individually selected from the group consisting of hydrogen and lower alkyl; Q is individually selected from the group consisting of lower alkyl and aryl; and P and Q taken together are lower alkylene.

The term "lower alkylene" comprehends polymethylene chains such as tetramethylene and pentamethylene.

In discussing the various starting materials, intermediates and end-products of this invention, the various protecting groups discussed above will not necessarily be specifically mentioned, but it should be understood that mention of any substituent comprehends the various protected forms thereof, unless specifically mentioned to the contrary.

In one embodiment of this invention, compounds of Formulae I through V are prepared from 9β,10β-desA-androstan-5-ones or 9β,10β-desA-pregnan-5-ones of the formula

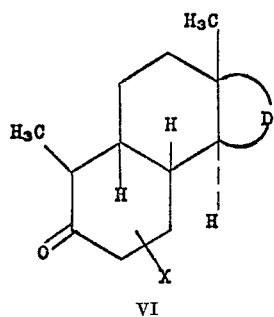

VI wherein X has the same meaning as above and D represents the carbon and hydrogen atoms necessary to complete the steroid D-ring, as well as the atoms in the substituents in the 16- and 17-positions, as defined in Formulae I–V above.

Thus, 9β,10α-androstanes of Formula I can be prepared from 9β,10β-desA-androstan-5-ones of the formula

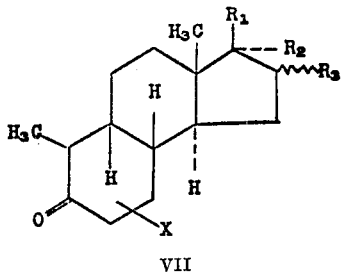

VII wherein $R_1$, $R_2$, $R_3$ and X have the same meaning as above.

Similarly, 9β,10α-androstanes of Formula II can be prepared from 9β,10β-desA-androstan-5-ones of Formula VIII and 9β,10α-androstanes of Formula III from 9β,10β-desA-androstan-5-ones of Formula IX.

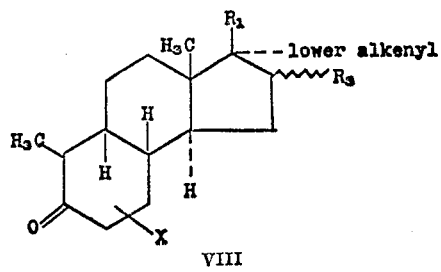

VIII

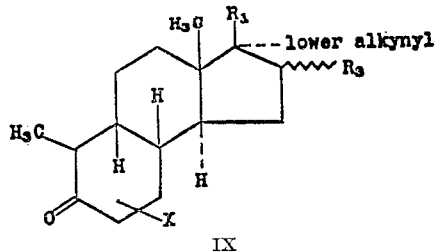

IX wherein $R_1$, $R_3$ and X have the same meaning as above.

Moreover, 9β,10α-17β-pregnanes of Formulae IV and V can be prepared from 9β,10β-desA-pregnan-5-ones of Formulae X and XI, respectively.

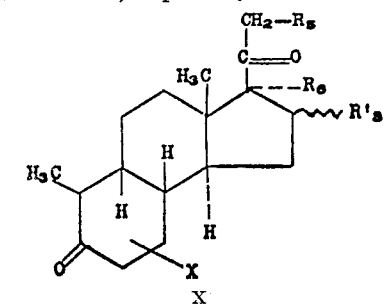

X

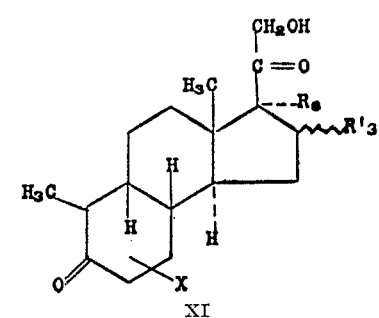

XI wherein $R'_3$, $R_5$, $R_6$ and X have the same meaning as above.

The conversion of a 9β,10β-desA-compound of Formula VI to a 9β,10α-steroid of Formulae I–V (i.e., VII→I, VIII→II, IX→III, X→IV and XI→V) is effected by condensing the 9β,10β-desA-compound with a compound selected from the group consisting of lower alkyl vinyl ketone (as well as substitutes thereof such as 1-dialkylamino-3-butanone, 1-dialkylamino-3-pentanone and quaternary ammonium salts thereof), 1,3-dichlorobut-2-ene, 1,3-dichloropent-2-ene, 1-bromobutan-3-one, 1-bromobutan-3-one lower alkylene ketal, 1-bromobutan-3-ol, 1-bromobutan-3-ol ether, esterified 1-bromobutan-3-ol, 1-bromopentan-3-one, 1-bromopentan-3-one lower alkylene ketal, 1-bromopentan-3-ol, 1-bromopentan-3-ol ether or esterified 1-bromopentan-3-ol. Methyl vinyl ketone is the preferred reagent. Prior to the condensation it is desirable to protect the 20-keto group present in compounds of Formulae X and XI, then it is not necessary to protect 16α,17α or 21-hydroxy groups which are present, but groups protecting these moieties can be retained through the condensation reaction.

When a lower alkyl vinyl ketone, 1-bromobutan-3-one or 1-bromopentan-3-one is used as the reaction partner for the condensation, ring closure to ring A (containing a 3-oxo moiety) of the desired 9β,10α-steroid of Formulae I–V occurs simultaneously with the condensation. However, when 1,3-dichlorobut-2-ene, 1,3-dichloropent-2-ene, 1-bromobutan-3-one lower alkylene ketal, 1-bromobutan-3-ol, 1-bromobutan-3-ol ether, esterified 1-bromobutan-3-ol, 1-bromopentan-3-one lower alkylene ketal, 1-bromopentan-3-ol, 1-bromopentan-3-ol ether, or esterified 1-bromopentan-3-ol is used as the reaction partner a subsequent step to generate the 3-oxo moiety is required. When 1-bromobutan-3-ol or 1-bromopentan-3-ol is used as the reaction partner, the oxo moiety can be generated by oxidation and for this purpose, it is suitable to use oxidation means known per se, for example, chromic acid, chromium trioxide in acetic acid or the like. When esterified or etherified 1-bromobutan-3-ol or esterified or etherified 1-bromopentan-3-ol is used as the reaction partner, hydrolysis of the esterified or etherified hydroxy group should be effected prior to oxidation. Suitable ester forming moieties are, for example, carboxylic acids, e.g. lower alkanoic acid such as acetic acid, benzoic acid, and the like; and hydrolysis of the reaction products obtained by reacting such 1-bromobutan-3-ol or 1-bromopentan-3-ol esters is suitably conducted by alkaline hydrolysis, e.g. via the use of an aqueous alkali metal hydroxide such as aqueous sodium hydroxide. Suitable ethers are, for example, lower alkyl ethers, i.e. 3-methoxy, 3-ethoxy or the like; and these are suitably hydrolyzed by acid hydrolysis, e.g. via the use of an aqueous mineral acid such as hydrochloric acid, sulfuric acid or the like. When a 1-bromobutan-3-one lower alkylene ketal or a 1-bromopentan-3-one lower alkylene ketal is used as the reaction partner, mild acid hydrolysis of the ketal moiety results in generation of the 3-oxo moiety. Finally, when 1,3-dichlorobut-3-ene or 1,3-dichloropent-3-ene is used as the reaction partner, the 3-oxo moiety can be generated by treatment with a concentrated mineral acid, preferably a strong acid such as hydrochloric acid or sulfuric acid. It should be noted, that 1,3-dichlorobut-2-ene and 1,3-dichloropent-2-ene may be used as reaction partners with compounds of Formulae X and XI, but not with the 17α-lower alkyl, alkenyl or alkynyl compounds of Formulae VIII–IX. As will be apparent, when a reaction partner based on butane (i.e. having a four carbon atom skeleton) is utilized a compound of Formulae I–V wherein Y is hydrogen is obtained. Similarly, when a reaction partner based on pentane is utilized a compound of Formulae I–V wherein Y is methyl is obtained.

In addition to the preparation of compounds of Formulae I–V from compounds of Formulae VI–XI by the use of the above mentioned reaction partners, it is also possible by the procedures of this invention to prepare compounds of Formulae I–V which, in the A-ring, in addition to containing an unsaturation between the 4- and 5-positions also contain an unsaturation between the 1- and 2-positions. Such 1,4-diene products corresponding to the compounds of Formulae I–V can be prepared from compounds of Formulae VI–XI by condensation of the latter with a reaction partner selected from the group consisting of ethinyl methyl ketone and ethinyl ethyl ketone (as well as substitutes therefor such as β-dialkylaminovinyl methyl or ethyl ketone, quaternary ammonium salts thereof, and β-lower alkoxy-vinyl methyl or ethyl ketone). Condensation to prepare such a 1,4-diene product corresponding to the compounds of Formulae I–V is effected under the same conditions as is the condensation to prepare a compound of Formulae I–V. The so-obtained 1,4-dienes are useful in the same way as the correspondingly substituted 4-ene-compounds of Formulae I–V.

The condensation is suitably effected at, below or above room temperature. For example, at the reflux temperature of the reaction medium or at ice temperature (0° C.) or below. Moreover, the condensation is suitably effected in an organic medium. Preferably the solvent is a lower alkanol, such as methanol or ethanol, or another nonketonic organic solvent, such as an ether, e.g. dioxane, aromatic hydrocarbon, e.g. benzene, toluene, xylene, organic acid, such as acetic acid, or the like. It is suitable to catalyze the condensation, and this can be effected via use of a catalyst such as an alkali metal lower alkoxide, for example sodium ethoxide or the like, alkali metal hydroxide, a quaternary ammonium hydroxide such as benzyl trimethyl ammonium hydroxide, para-toluene sulfonic acid, or the like.

When using a substitute for methyl or ethyl vinyl ketone, or for methyl or ethyl ethinyl ketone, the condensation should be effected under alkaline conditions. As indicated above, among such substitutes are 1-dialkyl amino-3-butanone, 1-dialkyl amino-3-pentanone and β-dialkyl amino-vinyl methyl or ethyl ketone. Preferred dialkylamino groups are dilower alkylamino groups such as dimethylamino, diethylamino, piperidino, morpholino, or the like. Preferred quaternary ammonium salts of such tertiary amino groups are, for example, those formed from lower alkyl halides such as methyl iodide. An exemplary β-lower alkoxyvinyl methyl or ethyl ketone is β-methoxyvinyl ethyl ketone.

One aspect of this invention is the hydrogenation of desA-androst-9-en-5-ones or desA-pregn-9-en-5-ones to 9β,10β-desA-androstan-5-ones of Formulae VII–IX or to 9β,10βdesA-pregnan-5-ones of Formulae X–XI. Thus, 9β,10β-desA-androstan-5-ones of Formula VII can be prepared via hydrogenation of desA-androst-9-en-5-ones of the formulae

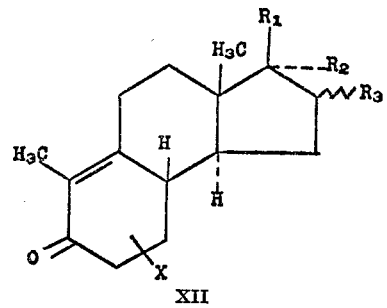

XII

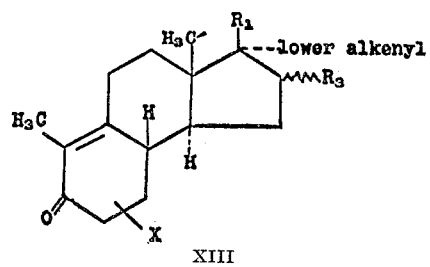

XIII

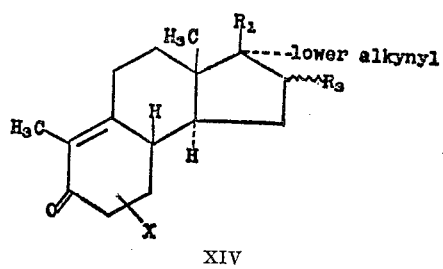

XIV wherein $R_1$, $R_2$, $R_3$ and X have the same meaning as above.

Also, 9β,10β-desA-pregnan-5-ones of Formula X and XI can be prepared by hydrogenation of desA-pregn-9-en-5-ones of the formulae

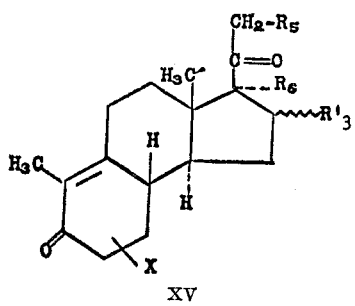

XV

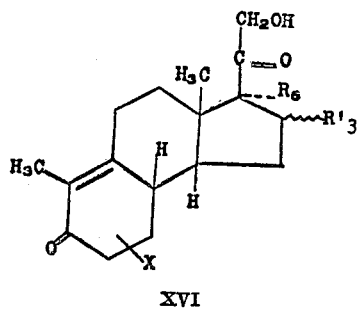

XVI wherein $R'_3$, $R_5$, $R_6$ and X have the same meaning as above.

Prior to hydrogenation, the C-20 keto group in compounds of Formulae XV and XVI or C-17 keto group in compounds of Formula XII should be protected either by conversion to the corresponding carbinol or by ketalization as described above.

Moreover, it should be noted that the hydrogenation, besides inserting a hydrogen atom in each of the 9- and 10-positions, can also simultaneously effect hydrogenation of other groups in the molecule. For example, the C-20-keto group can be hydrogenated to the corresponding carbinol or the C-17 lower alkenyl group in compounds of Formula XIII or the C-17 lower alkynyl group in compounds of Formula XIV can be hydrogenated to the corresponding C-17-lower alkyl compounds. Compounds of Formulae VIII and IX can, in turn, be prepared from compounds of Formula VII wherein $R_1$ and $R_2$ together are oxo via reaction with a lower alkenyl or lower alkynyl Grignard reagent, with prior protection of the 5-keto group, for example, by forming 5-ketals without concurrent blocking of the 17-keto group. In the same manner compounds of Formulae XIII and XIV can be formed from compounds of Formula XII wherein $R_1$ and $R_2$ taken together are oxo.

The hydrogenation of desA-androst-9-en-5-ones of Formulae XII–XIV and of desA-pregn-9-en-5-ones of Formulae XV–XVI is one of the main features of this invention. It is effected by catalytic hydrogenation, suitably using a precious metal catalyst. Especially preferred precious metal catalysts are palladium, platinum and rhodium. It is particularly advantageous to use rhodium, for example, rhodium on charcoal or rhodium on alumina. In contrast to what would be expected, it has been found that such a catalytic hydrogenation of a compound of Formulae XII–XVI gives a substantial yield of a compound of Formulae VI–XI. In fact, it has been found that such catalytic hydrogenation gives a major proportion of a compound of the Formulae VI–XI. This catalytic hydrogenation is suitably effected in an inert organic solvent, for example, a lower alkanol such as methanol or ethanol, an ether such as dioxane or diglyme, a hydrocarbon such as cyclohexane, hexane, or the like. Moreover, it is suitably conducted in the presence of an acidic or basic catalyst, for example, an alkali metal or alkaline earth metal hydroxide such as sodium hydroxide or the like, or a mineral acid, for example, a hydrohalic acid, such as hydrochloric acid or the like. The reaction can be conducted at, above or below room temperature, for example, from about $-5°$ C. to about $100°$ C. However, it is preferably conducted at a temperature between about $0°$ C. and about $35°$ C.

As described above, the desA-androst-9-ene-5-ones or desA-17β-pregn-9-en-5-ones of Formulae XII–XVI can be prepared from natural steroids by a variety of methods. Thus, in one embodiment of this invention said desA-androst-9-en-5-ones or desA-17β-pregn-9-en-5-ones can be prepared from steroids of the 3-oxo-androst-4-ene- or 3-oxo-17β-pregn-4-ene series by a reaction sequence which involves as a first step in oxidative ring opening of ring A of the natural steroid. For this oxidative ring opening there can be used as starting materials, natural steroids of the 3-oxo-androst-4-ene or 3-oxo-17β-pregn-4-ene of the formula:

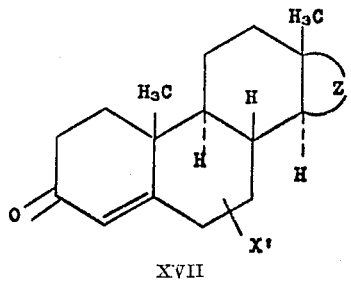

XVII wherein X' is a substituent in the 6-position selected from the group consisting of hydrogen, lower alkyl, lower alkylthio and lower alkanoylthio or a substituent in the 7-position selected from the group consisting of hydrogen, lower alkyl, lower alkylthio, lower alkanoylthio and halogen, and Z represents the carbon and hydrogen atoms necessary to complete the steroid D-ring, as well as the atoms in the substituents in the 16- and 17-positions as defined in Formulae I, IV, and V above.

The oxidative ring opening of a natural steroid of Formula XVII yields a 5-oxo-3,5-seco-A-norandrostan-3-oic acid or a 5-oxo-3,5-seco-A-norpregnan-3-oic acid of the formula

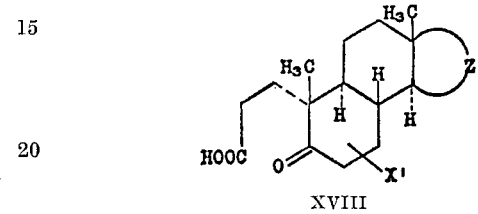

XVIII wherein X' and Z have the same meaning as above.

The oxidative ring opening of the compound of Formula XVII can be performed by a variety of methods. In a preferred embodiment it is effected by ozonolysis. The ozonolysis is suitably carried out in an organic solvent, for example, acetic acid, ethyl acetate, methanol, chloroform, methylene chloride, or the like, or a mixture of two or more of such solvents such as ethyl acetate/acetic acid, ethyl acetate/methylene chloride, or the like. Moreover, the ozonolysis is advantageously conducted at below room temperature. Thus, it is preferably conducted at a temperature between about $-70°$ C. and about $25°$ C. The resulting ozonides can be decomposed by conventional means, for example, by treatment with water, hydrogen peroxide in water, acetic acid or ethyl acetate, or the like. The oxidative ring opening of a compound of Formula XVII to a compound of Formula XVIII can also be effected by other oxidation means, for example, by treatment with hydrogen peroxide. It should be noted that an oxidative ring opening by either ozonolysis or by treatment with hydrogen peroxide, does not require protection of any of the substituents at C-16 or C-17. However, as stated above, it may be desirable to protect these substituents against some subsequent reaction in the total reaction sequence being practiced. On the other hand, the oxidative ring opening can also be effected by oxidation with chromium trioxide or via treatment with sodium periodate and potassium permanganate in potassium carbonate solution and if these oxidation means are used, it is necessary to protect any secondary hydroxy groups which might be present such as a 16,17β- or 21-hydroxy group; preferably, for the purpose of this reaction, with non-aromatic protecting groups.

Following the oxidative ring opening of the A-ring, the so-obtained 5-oxo-3,5-seco-A-norandrostan-3-oic acid or 5-oxo-3,5-seco-A-norpregnan-3-oic acid of Formula XVIII is converted into a mixture of a 10α-desA-androstan-5-one and a 10β-desA-androstan-5-one or a mixture of a 10α-desA-pregnan-5-one and a 10β-desA-pregnan-5-one as illustrated below:

XVIII
↓
alkali metal salt of XVIII

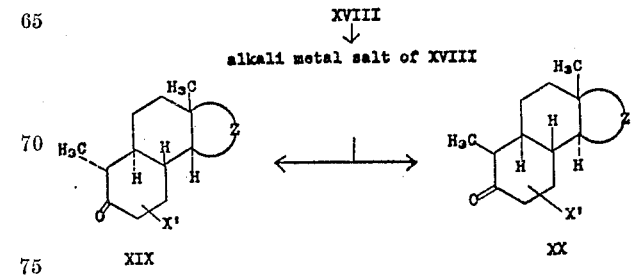

XIX   XX wherein in Formulae XIX and XX, X' and Z have the same meaning as above.

The compounds of Formula XIX are 10α-desA-androstan-5-ones or 10α-desA-pregnan-5-ones, depending on the meaning of Z, and the compounds of formula XX are 10β-desA-androstan-5-ones or 10β-desA-pregnan-5-ones. The conversion of a compound of Formula XVIII into the compounds of Formulae XIX and XX is effected by pyrolysis. Prior to effecting the pyrolysis, it is desirable to convert the 3-oic acid of Formula XVIII into a corresponding metal salt, for example, an alkali metal salt such as the sodium salt. The pyrolysis can be conducted at atmospheric pressure or in a vacuum, but it is preferably conducted in a vacuum, at a temperature from about 200° C. to about 350° C. in the presence of a proton acceptor, e.g. an alkali metal or alkaline earth metal salt of a weak organic acid, for example, potassium acetate, sodium acetate, sodium phenylacetate, sodium bicarbonate, or the like. Especially preferred is a vacuum of from about .001 to about .5 mm. Hg. Accordingly, it is advantageous to conduct the pyrolysis under alkaline conditions, i.e. at a pH greater than 7.

In another aspect, compounds of Formula XIX can be prepared from compounds of the formula

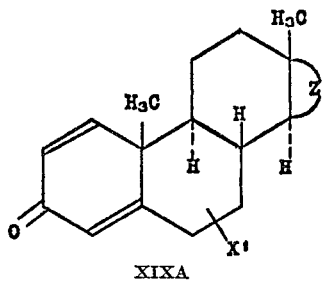

XIXA wherein X' and Z have the same meaning as above.

The compounds of Formula XIX can be prepared from compounds of Formula XIX A in the same manner that compounds of Formula XIX are prepared from compounds of Formula XVII, i.e. by oxidative ring opening of the A-ring of a compound of Formula XIX A followed by elimination of the residue of the A-ring, to yield a compound of Formula XIX. The oxidative ring opening of the compound of XIX A can be performed by ozonolysis as described above for the conversion of a compound of Formula XVII to a compound of Formula XVIII. Such ozonolysis of a compound of Formula XIX A yields a compound of the formula

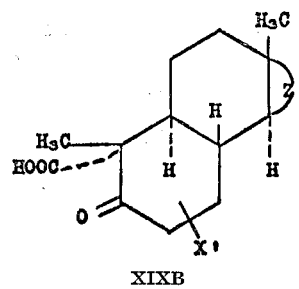

XIXB wherein X' and Z have the same meaning as above.

A compound of Formula XIX B can then be converted to a compound of Formula XIX. This removal of the residue of the A-ring, i.e. decarboxylation, can be effected by heating in an acidic or basic medium. It is preferred to heat to the reflux temperature of the medium which is preferably an inert organic solvent such as a lower alkanol, e.g. ethanol, dioxane, ether or the like. The decarboxylation yields mainly a compound of Formula XIX, but also a minor yield of the corresponding 10β-isomer of Formula XX.

Compounds of Formula XIX can also be formed from a compound of Formula XVIII via the formation of an enol-lactone of a compound of Formula XVIII, i.e. via the formation of a 4-oxo-androst-5-en-3-one or a 4-oxo-pregn-5-en-3-one of the formula:

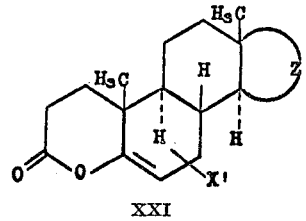

XXI wherein X' and Z have the same meaning as above, which can then be reacted with a Grignard reagent, such as phenyl magnesium bromide or phenyl lithium, to form the resulting aldol of, for example, the formula

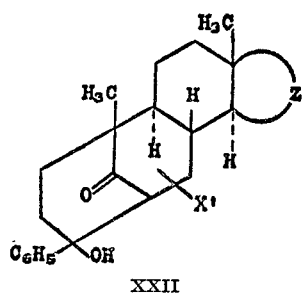

XXII wherein X' and Z have the same meaning as above, which, upon treatment with an alkali metal hydroxide, such as potassium hydroxide, at an elevated temperature, for example, from about 200° C. to about 240° C., is converted to the corresponding 10α-desA-androstan-5-one or 10α-desA-pregnan-5-one of Formula XIX.

It should be noted that though the pyrolysis of a compound of Formula XVIII yields both the 10β-compounds of Formula XX and the 10α-compounds of Formula XIX, and though either of these isomers can be used in the subsequent halogenation and dehydro-halogenation steps of this reaction sequence, it is sometimes preferable to convert the 10β-compound of Formula XX into the corresponding 10α-compound of Formula XIX. This conversion can be effected by treating a 10β-desA-androstan-5 - one or 10β - desA - pregnan - 5 - one of Formula XX with any base capable of producing a carbanion; for example, it is suitable to use an alkali metal lower alkoxide in an organic solvent such as a lower alkanol, for example, sodium ethoxide in an ethanol solution or sodium methoxide in a methanol solution.

The above-discussed conversion via the alkali metal salt and pyrolysis of compounds of Formula XVIII to compounds of Formulae XIX and XX can be effected without protection of any of the substituents which might be present at C–16 or C–17. However, if it is desired for either preceding or succeeding reaction steps of the total reaction sequence, the conversion of a compound of Formula XVIII to compounds of Formulae XIX and XX can be effected with protecting groups present on substituents in the C–16 or C–17 position.

As stated above, the 10α-desA-androstan-5-ones or 10α-desA-pregnan-5-ones of Formula XIX or the 10β-desA-androstan-5-ones of 10β-desA-pregnan-5-ones of Formula XX can be converted via a two-step sequence of halogenation and dehydrohalogenation into the desired starting material desA - androst - 9 - en - 5 - one or desA-pregn-9-en-5-one of Formulae XII, XV, and XVI.

In a preferred embodiment of a 10α-desA-androstan-5-one or a 10α-desA-pregnan-5-one of Formula XIX is subjected to the two-step sequence of halogenation and dehydrohalogenation. Halogenation of a compound of Formula XIX or a compound of Formula XX yields a mixture of corresponding halogenated compounds including one of the formula

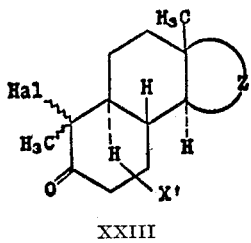

XXIII wherein X' and Z have the same meaning as above, and Hal is a halogen atom (preferaby Br or Cl).

Dehydrohalogenation of a compound of Formula XXIII then yields a desired starting material of Formulae XII, XV, XVI. Keto groups except for the 5-keto group, may require protection prior to the halogenation. In the case of compounds of Formulae XIX and XX containing the C-17 dihydroxyacetone side chain, represented in Formula V wherein $R_6$ is hydroxy, this protection can be effected by formation of the 17a,20;20,21-bis-methylenedioxy derivative. In other cases wherein a C-17 oxo or C-20 oxo group is present, protection can be effected by reduction to the corresponding carbinol either directly prior to the halogenation step or prior to some other step in the reaction sequence leading to the compounds of Formulae XIX and XX.

The halogenation can be effected with halogenating agents such as bromine, sulfuryl chloride, or the like. Bromination is especially preferred. The bromination is suitably effected by treatment with bromine at room temperature or below, preferably at ice temperature or below. Suitably it is conducted in an organic medium; for example, an organic acid such as acetic acid; an ether such as an anhydrous ether, dioxane, tetrahydrofuran; a chlorinated organic solvent such as methylene chloride, chloroform, carbon tetrachloride; or the like; with the addition of hydrogen bromide as a catalyst.

The subsequent dehydrohalogenation of a compound of Formula XXIII is preferably conducted under mild dehydrohalogenating conditions; for example, by the use of an alkali metal carbonate (e.g. lithium carbonate) or an alkali metal halogenide (e.g. a lithium halide) in an organic solvent such as a di-lower alkylformamide, or with an organic base such as collidine, pyridine, or the like. The dehydrohalogenation is advantageously conducted at slightly elevated temperatures, for example, from about 50° C. to about 150° C., preferably from about 80° C. to about 120° C.

Separation of the desired product desA-androst-9-en-5- one or desA-pregn-9-en-5-one of Formulae XII, XV and XVI can be effected by conventional means. As indicated above the halogenation procedure may result in halogenated by-products in addition to the desired intermediate of Formula XXIII. Accordingly, the separation is preferably effected after first subjecting the reaction mixture to dehalogenating conditions in order to dehalogenate the halogenated by-products formed by the halogenation procedure, but not dehalogenated by the dehydrohalogenation. Following such dehalogenation the reaction mixture can then easily be separated by conventional means, for example, by column chromotography, to yield the desired compound of Formulae XII, XV, XVI. An exemplary dehalogenation means is treatment with zinc and sodium acetate in an acetic acid solution at an elevated temperature, for example, about 80° C.

In the case of compounds of Formulae XIX or XX which contain a halogen atom on a carbon atom directly adjacent to a keto group, it is preferable to protect such a halogen atom against dehalogenation prior to subjecting the compound of Formulae XIX or XX to the two step sequence of halogenation and dehydrohalogenation of this embodiment. Such a grouping, containing a halogen atom on a carbon atom directly adjacent to a keto group, is illustrated in a compound of Formulae IV or V wherein $R_5$ or $R_6$ is halogen. Thus, if 10α- or 10β-desA-pregnan-5-one of Formulae XIX or XX containing a 17α- or 21-halo substituent is to be subjected to the halogenation-dehydrohalogenation sequence it is desirable to first effect protection of the 17α- or 21-halo substituent. This protection can be effected, for example, by ketalization of the 20-oxo group.

As stated above, the desired desA-androst-9-en-5-ones or desA-pregn-9-en-5-ones starting materials can also be prepared from steroids of the 3-oxo-androst-4-ene or 3-oxo-17-β-pregn-4-ene series containing an 11-hydroxy substituent. In one embodiment an 11-hydroxy steroid of the formula

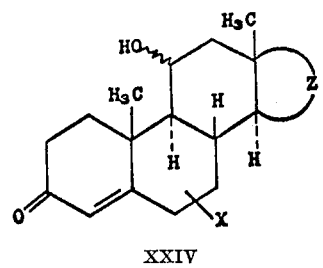

XXIV wherein X and Z have the same meaning as above, is reacted with an acid or a reactive derivative thereof to form a leaving group in the 11-position. By reactive derivative is meant, for example, a halide, e.g. a chloride, an anhydride, or the like. Though either 11β- or 11α-hydroxy starting materials can be used, it is preferable to utilize α-hydroxy compounds of Formula XXIV as starting materials. Prior to the esterification reaction, it is preferable to protect hydroxy groups present in the C-16, C-17, or C-21 position. Suitable acids for the esterification of the 11-hydroxy group, which can be used to form a leaving group in the 11-position are inorganic acids such as phosphoric acid, organic carboxylic acids such as anthraquinone β-carboxylic acid or organic sulfonic acids, for example, toluene-sulfonic acids, especially p-toluene sulfonic acid, lower alkyl-sulfonic acids such as methanesulfonic acid and nitrophenylsulfonic acids, especially p-nitrophenylsulfonic acid. Especially preferred as the leaving group in the 11-position is a lower alkylsulfonyloxy group such as the mesoxy group. However, when it is desired to react a compound of Formula XXIV with a sulfonyloxy forming moiety, then a compound of Formula XXIV having an 11α-configuration should be used as a starting material. The above described esterification of 11-hydroxy steroid starting materials of Formula XXIV yield compounds of the formula

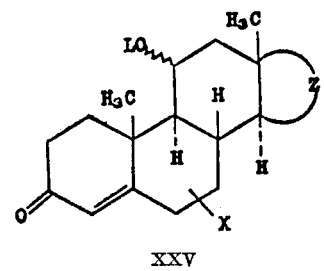

XXV wherein X and Z have the same meaning as above, and LO represents the leaving group.

In the next step of this reaction sequence, the so-formed 11-(esterified hydroxy) - compound of Formula XXV is subjected to an oxidative ring opening of the A-ring to yield the corresponding 11 - (esterified hydroxy)-5 - oxo - 3,5 - seco - A - norandrostan - 3 - oic acid or 11 - (esterified hydroxy) - 5 - oxo - 3,5 - seco - A - norpregnan - 3 - oic acid of the formula

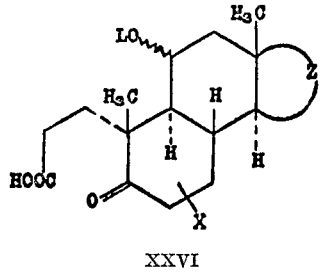

XXVI wherein X, Z and LO have the same meaning as above.

The oxidative ring opening of the A-ring of a compound of Formula XXV to a compound of Formula XXVI can be effected by ozonolysis as described above for the oxidative ring opening of the A-ring of a compound of Formula XVII to a compound of Formula XVIII. Pyrolysis of the so-formed compound of Formula XXVI under the conditions described above for the pyrolysis of a compound of Formula XVIII to compounds of the Formulae XIX and XX directly yields the desired desA - androst - 9 - en - 5 - one or desA - pregn-9 - en - 5 - one of Formulae XII, XV, XVI. Thus, pyrolysis of a compound of Formula XXVI directly results in elimination of the leaving group in the 11-position as well as a splitting off the residue of ring A attached to the 10-position. This procedure of starting from an 11-hydroxy steroid (preferably 11α-hydroxy) of Formula XXIV and proceeding through intermediates of Formulas XXV and XXVI to compounds of Formulae XII, XV, XVI represents a particularly elegant procedure for preparting the latter compounds.

In yet another embodiment of this invention starting material 11-hydroxy steroids of Formula XXIV can be directly subjected to an oxidative ring opening of the A-ring by ozonolysis or treatment with hydroxide peroxide, as described above for the oxidative ring opening of the A-ring of a compound of Formula XVII to a compound of Formula XVIII. This oxidative ring opening of the A-ring of a compound of Formula XXIV yields an 11-hydroxy - 5 - oxo - 3,5 - seco - A - norandrostan - 3-oic acid 3,11 - lactone or an 11 - hydroxy - 5 - oxo - 3,5-seco - A - norpregnan - 3 - oic acid 3,11 - lactone of the formula

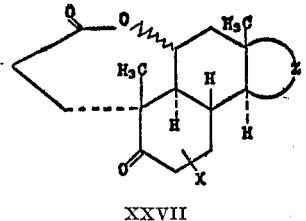

XXVII wherein X and Z have the same meaning as above. Treatment of the 3,11 - lactone of Formula XXVII with an alkali metal hydroxide such as sodium hydroxide gives the salt of the same keto acid. Without isolation, this salt can then be subjected to pyrolysis yielding a mixture of an 11 - hydroxy - 10α - desA - androstan - 5 - one and an 11 - hydroxy - 10β - desA - androstan - 5 - one or a mixture of an 11 - hydroxy - 10α - desA - pregnan-5- one and an 11 - hydroxy - 10β - desA - pregnan - 5 - one, as illustrated below:

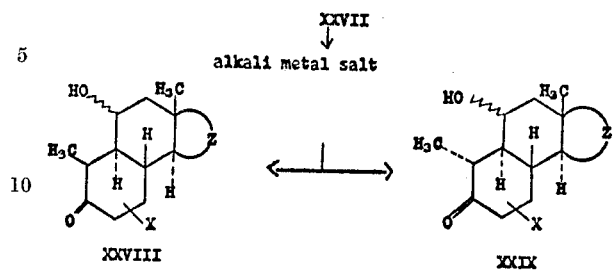

wherein in formulas XXVIII and XXIX, X and Z have the same meaning as above.

This pyrolysis of an alkali metal derived from a compound of Formula XXVII can be effected under the same conditions as described above for the pyrolysis of a compound of Formula XVIII to compounds of the Formulae XIX and XX. Though either the 10β-compound of Formula XXVIII or the 10α - compound of Formula XXIX can be subjected to the subsequent steps of this reaction sequence, it is suitable to utilize the 10β-compound of Formula XXVIII. Conversion of the 10α-compound of Formula XXIX to the 10β-compound of Formula XXVIII can be effected under the same conditions as described above for the conversion of the compound of Formula XX to a compound of Formula XIX.

In the next step of this reaction sequence, the 11-hydroxy compound of Formula XXVIII or of Formula XXIX can be subjected to esterification whereby to convert the 11-hydroxy group to a leaving group in the 11-position. This esterification can be effected with the same acids or acid derivatives and in the same manner as described above for the esterification of a compound of Formula XXIV to a compound of Formula XXV. As in that instance, it is also preferred in the present instance to form a mesoxy leaving group in the 11-position, though, of course, other leaving groups as described above are useful for the instant purpose. There is thus obtained a compound of the formula

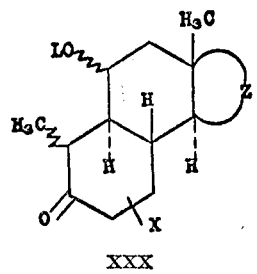

XXX wherein X, Z and LO have the same meanings as above.

The leaving group can then be eliminated from the 11-position of a compound of Formula XXX resulting in a direct formation of a desA-androst-9-en-5-one or a desA-pregn-9-en-5-one of Formulae XII, XV, XVI. This elimination can be effected by any conventional elimination means. It is suitably conducted under alkaline conditions in an anhydrous organic solvent. Preferably, it is effected by heating, i.e. at a temperature between about room temperature and the reflux temperature of the reaction mixture. Thus, treatment of a compound of Formula XXX with either an inorganic or organic base results in the formation of the desired compound of Formulae XII, XV, XVI. Preferably a weak base is used, for example, a salt of a carboxylic acid (e.g. a lower alkanoic acid) with an alkali metal or an alkaline earth metal, for example, sodium acetate, potassium acetate, or the like. As indicated, the elimination is suitably conducted in an anhydrous organic solvent; suitable are solvents such as dilower alkyl-formamides, e.g. dimethyl formamide, lower alkanoic acids, e.g. acetic acid, or the like. When a proton accepting solvent, such as dimethyl formamide, is used, it itself can serve as the base for the purpose of this elimination reaction; i.e. if the solvent is basic then the elimination can be conducted without the addition of a separate basic material.

In another aspect, compounds of Formula XXX can be prepared from compounds of the formula

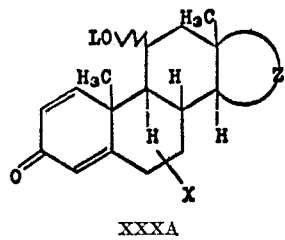

XXXA wherein X, Z and LO have the same meanings as above.

The compounds of Formula XXXA can be prepared from corresponding 11-hydroxy compounds by esterification as described above for the preparation of compounds of Formula XXV from compounds of Formula XXIV. The compounds of Formula XXX can be prepared from compounds of Formula XXXA in the same manner that compounds of Formula XXX are prepared from compounds of Formula XXV, i.e. by oxidative ring opening of the A-ring of a compound of Formula XXXA followed by elimination of the residue of the A-ring to yield a compound of Formula XXX. The oxidative ring opening of the compounds of Formula XXXA can be performed by ozonolysis as described above for conversion of a compound of Formula XXV to a compound of Formula XXVI. Such ozonolysis of a compound of Formula XXXA yields a compound of the formula

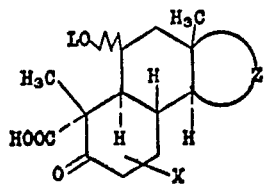

XXXB wherein X, Z and LO have the same meaning as above. A compound of Formula XXXB can then be converted to a compound of Formula XXX. This removal of the residue of the A-ring, i.e. decarboxylation, can be effected as described above for the conversion of a compound of Formula XIXB to a compound of Formula XIX.

The compounds of Formulae I–V preparable by the methods of this invention are not only pharmaceutically useful compounds as described above, but also are themselves useful as intermediates for other 9β,10α-steroids; for example, compounds wherein X is hydrogen or lower alkyl can be modified so as to introduce unsaturation between C-6 and C-7. This can be effected by dehydrogenation means, for example, by halogenation followed by dehydrohalogenation or by means of 2,3-dichloro-5,6-dicyanobenzoquinone, according to known methods. Thus, for example, a 9β,10α-progesterone of Formula IV wherein X is hydrogen or lower alkyl can be converted to a 9β,10α-pregna-4,6-dien-3,20-dione.

A further embodiment of this invention comprises the preparation of 9β,10α-steroids of Formulae I–V containing an 11-hydroxy substituent. This can be effected by utilizing an 11-hydroxy-10α-desA-androstan-5-one or 11-hydroxy-10α-desA-pregnan-5-one of Formula XXIX or an 11-hydroxy-10β-desA-androstan-5-one or 11-hydroxy-10β-desA-pregnan-5-one of Formula XXVIII as the starting materials. It is preferred in this embodiment to use the 10β-isomers of Formula XXVIII as starting materials. As a first step in this the 11-hydroxy group of the compound of Formula XXVIII or XXIX should be protected. This is suitably effected by esterification, preferably with a carboxylic acid, for example, a lower alkanoic acid such as acetic acid, benzoic acid, or the like. Conversion of the so-obtained 11-esterified hydroxy compound then yields an 11-(esterified hydroxy)-desA-androst-9-en-5-one (i.e. a compound of Formula XII containing an 11-esterified hydroxy moiety) or an 11-esterified hydroxy-desA-pregn-9-en-5-one (i.e. a compound of Formula XV–XVI containing an 11α-esterified hydroxy moiety). This conversion can be effected by halogenation followed by dehydrohalogenation, as described above for the conversion of a compound of Formula XIX or XX to a compound of Formula XII, XV or XVI. Catalytic hydrogenation of the so-obtained compound of the formula

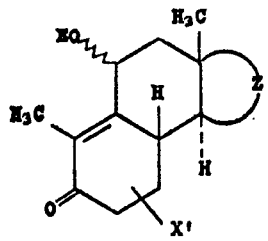

XXXI wherein X' and Z have the same meaning as above, and EO is an esterified hydroxy group as described above in this paragraph, yields an 11-esterified hydroxy-desA-9β,10β-androstan-5-one or 11-esterified hydroxy-desA-9β,10β-pregnan-5-one, of the formula

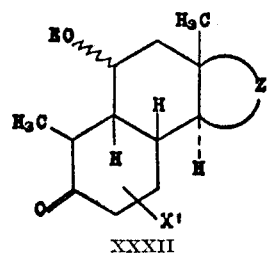

XXXII wherein X', Z and EO have the same meaning as above. This hydrogenation can be conducted in the same manner as described above for the hydrogenation of a compound of Formula XII–XVI to a compound of Formula VII, X, XI. Also, compounds of Formula XXXII containing a 17-oxo moiety can be converted to a corresponding compound containing a 17β-hydroxy, 17α-lower alkenyl or lower alkynyl moiety by the methods described above. Also, compounds of Formula XXXII can be hydrolyzed to yield corresponding 11-hydroxy compounds of Formula XXXII, i.e. wherein EO is hydroxy.

Condensation of the so-obtained compound of Formula XXXII or the corresponding 17β-hydroxy, 17α-lower alkenyl or lower alkynyl compound (i.e. a compound of Formula VI containing a free or 11-esterified hydroxy group) then yields the desired end-product 9β,10α-steroid of Formula I–V containing an 11-hydroxy group. Such condensation can be effected as described above for the preparation of a compound of Formula I–V from a compound of Formula VI–XI. The so-obtained 9β,10α-steroids containing an 11-esterified hydroxy group can be hydrolyzed to the corresponding compounds containing an 11-hydroxy group, which latter compounds are themselves useful as intermediates, for example, the 11-hydroxy group can be oxidized by methods known per se to yield corresponding 11-oxo steroids analogous to compounds of Formulas I–V.

The pharmaceutically useful compounds prepared by the methods of this invention can be administered internally, for example, orally or parenterally, with dosage adjusted to individual requirements. They can be administered in conventional pharmaceutical forms, e.g. capsules, tablets, suspensions, solutions, or the like.

The following examples are illustrative but not limitative of this invention. All temperatures are in degrees centigrade. The Florisil adsorbent used infra is a synthetic magnesia-silica gel. (cf. p. 1590, Merck Index, 7th edition, 1960). 100–200 mesh material was used. Throughout this application when compounds of the pregnane series are referred to it should be understood that it is compounds of the 17β-pregnane series that are being referred to, unless specifically indicated to the contrary, and whether or not the compound of the pregnane series is specifically indicated as of the 17β-series.

Example 1

A solution of 3.2 g. of 17α-ethyltestosterone in 50 ml. methylene chloride and 25 ml. ethyl acetate was ozonized at −70° (acetone-Dry Ice bath) until the solution was blue in color. After oxygen was passed through, the solution was evaporated at room temperature in vacuo. The syrupy residue was then dissolved in 100 ml. of glacial acetic acid, and after addition of 5 ml. of 30 percent hydrogen peroxide, left for 24 hours at 0–5°. Following this time, it was evaporated to dryness, dissolved in 1500 ml. ether, and extracted with 2 N sodium carbonate solution. The alkaline extract was poured in ice cold hydrochloric acid. The resultant crystalline 17α-ethyl-17β-hydroxy-5-oxo-3,5-seco-A-norandrostan-3-oic acid was filtered, washed with water and dried. Upon being recrystallized from acetone, it melted at 196–197°.

Example 2

A solution of 1.5 g. of 17α-ethyl-17β-hydroxy-5-oxo-3,5-seco-A-norandrostan-3-oic acid in 100 ml. of methanol was titrated with 2 N sodium methoxide to the reddish color of phenolphthaleine, and then evaporated to dryness in vacuo, giving as the residue, the sodium salt of 17α - ethyl-17β-hydroxy-5-oxo-3,5-seco-A-norandrostan-3-oic acid. 5 g. of sodium-phenylacetate was added to the residue, and the mixture pyrolyzed in vacuo (<0.1 mm.) at 285–295°, for 2.5 hours. The sublimate was dissolved in acetone, filtered and the filtrate concentrated in vacuo. The resultant syrupy residue was chromatographed on a 60 g. Florisil (adsorbent) column. The fractions eluted with benzene and 0.5 percent ethylacetate in benzene were combined and gave 17α - ethyl-17β-hydroxy-10α-desA-androstan-5-one, M.P. 94–95° after recrystallization from petroleum ether. The fractions eluted with 2 percent and 5 percent ethylacetate in benzene were combined and gave 17α - ethyl-17β-hydroxy-10β-desA-androstan-5-one, M.P. 185–185.5°, after two recrystallizations from petroleum ether.

Example 2a

To a solution of 100 mg. of 17α-ethyl-17β-hydroxy-10β-desA-androstan-5-one in 10 ml. of absolute ethanol was added one equivalent of sodium ethoxide dissolved in 5 ml. of absolute ethanol. This reaction mixture was maintained at room temperature overnight, then acidified with glacial acetic acid, poured in water and extracted with methylene chloride. The extract was washed with water, dried over anhydrous sodium sulfate and concentrated in vacuo. Thin layer chromatography showed the product to be 17α-ethyl-17β-hydroxy-10α-desA-androstan-5-one. It was obtained crystalline from petroleum ether-ether and melted at 89–95°.

Example 3

1.13 g. of 17α-ethyl-17β-hydroxy-10α-desA-androstan-5-one was dissolved in 120 ml. of anhydrous ether (or 1.13 g. of 10β-isomer was dissolved in 300 ml. of anhydrous ether), and after cooling in a salt-ice bath, several drops of 30 percent hydrobromic acid in acetic acid were added. This was followed by the dropwise addition during five minutes of 0.684 g. of bromine dissolved in 2 ml. of acetic acid. This addition was synchronized with the decoloration rate of the reaction mixture. Immediately after this, 5 ml. of a saturated solution of sodium bisulfite and 5 ml. of 2 N sodium carbonate solution were added. The mixture was then transferred into a separatory funnel, 500 ml. of ether added, shaken and separated. The ether part was washed with water, dried and evaporated. The resultant bromides were dissolved in 100 ml. of dimethylformamide, and after addition of 3 g. of lithium carbonate, the solution was heated at 100° for 45 minutes. After cooling, it was poured into one liter of ether, washed with water, 1 N hydrochloric acid, 2 N sodium carbonate, water, dried and evaporated. The residue was dissolved in 40 ml. of glacial acetic acid, 1.2 g. of sodium acetate and 1.2 g. of zinc powder added, and the so-formed mixture heated 10 minutes at 80°. It was then poured into one liter of ethylacetate and the resultant solution washed with saturated sodium bicarbonate, then with water, dried and evaporated. The residue was chromatographed on Florisil (adsorbent) column. The fraction with benzene and ½ percent ethylacetate in benzene gave regenerated starting material. Fractions with 1 and 2 percent ethylacetate in benzene gave 17α-ethyl-17β-hydroxy-desA-androst-9-en-5-one, which after sublimation (140° and 0.1 mm. Hg vacuum), was obtained as a glass. $[\alpha]_D^{25}$ −36.6° (c.=1, $CHCl_3$).

Example 4

A suspension of 262 mg. of 5 percent rhodium on alumina catalyst in a mixture of 26 ml. of 95 percent ethanol and 5.25 ml. of 2 N sodium hydroxide solution was pre-reduced, (i.e. hydrogenated at room temperature and atmospheric pressure). To this was added a solution of 262 mg. of 17α-ethyl-17β-hydroxy-desA-androst-9-en-5-one in 15 ml. of 95 percent ethanol, and the mixture then hydrogenated at atmospheric pressure and room temperature. After one mole-equivalent of hydrogen was absorbed, the reaction was stopped, the catalyst was separated by filtration, and the filtrate evaporated in vacuo. Glacial acetic acid (1 ml.) was added to the residue, which was then dissolved in 1 liter of ether. The cloudy solution which resulted was washed with 2 N $Na_2CO_3$ solution, then with water, dried and evaporated to dryness in vacuo.

The reaction was repeated 3 more times, and the combined products chromatographed on a Florisil (adsorbent) column. The eluates with 1 percent ethyl acetate in benzene gave first crystalline fractions, which were followed by non-crystalline fractions. The non-crystalline fractions were dissolved in 100 ml. of methylene chloride, and after the addition of 2.5 ml. of 2 percent $CrO_3$ in 90 percent acetic acid, stirred overnight. The excess of chromic acid was removed by washing the methylene chloride solution with 10 ml. of 10 percent sodium hydrogen sulfite solution, followed by washing with 2 N $Na_2CO_3$ solution and then with water. It was then dried and evaporated in vacuo. The residue was dissolved in 50 ml. of anhydrous ethanol containing 172 mg. of sodium ethoxide, and left overnight. The next day, after addition of 0.5 ml. of glacial acetic acid, the solution was evaporated in vacuo, and the residue was taken up in 1 liter of ether. The ether solution was washed with 2 N $Na_2Co_3$ solution, then with water, dried and evaporated. The residue was chromatographed on Florisil (adsorbent) column and gave crystalline 17α-ethyl-17β-hydroxy-desA-9β,10β-androstan-5-one identical (by thin layer chromatography) with the crystalline material obtained in the first chromatographic separation. After two recrystallizations from ether, it melted at 142–144°; $[\alpha]_D^{25}$ −11.65° [methanol, c.=1.245 percent].

Example 5

To a solution of 132 mg. of 17α-ethyl-17β-hydroxy-desA-9β,10β-androstan-5-one in 12.5 ml. of absolute ethanol containing 34 mg. of sodium ethoxide, 0.15 ml. of freshly distilled methylvinyl ketone was added. The reaction mixture was then refluxed for two hours in a nitrogen atmosphere. After cooling the reaction mixture, 0.1 ml. of glacial acetic acid was added thereto and the resulting mixture was then poured into 1 liter of ether. The resultant ether solution was washed with water, dried over anhydrous sodium sulfate and evaporated in vacuo. The residue was chromatographed on fluorescent silica-gel plates, with the solvent system, 60 percent ethyl acetate-40 percent heptane. The fluorescent part of the layers was extracted with ethyl acetate. The residue obtained after evaporation of ethyl acetate was first crystallized from ether-petroleum ether, then a second time from pure ether, yielding 17α-ethyl-9β,10α-testosterone, M.P. 131–135°.

Example 6

A solution of 6.4 g. of 11α-hydroxy-progesterone in 100 ml. of ethylacetate and 50 ml. of methylene chloride was treated with ozone at −70° until the solution became blue in color. Oxygen was then passed through and the solution evaporated at room temperature in vacuo. The so-obtained syrupy residue was dissolved in 100 ml. of glacial acetic acid, and after the addition of 5 ml. of 30 percent hydrogen peroxide, left for 24 hours at 2° (in an ice box). The solution was then evaporated in vacuo, and the residue triturated with ether yielding crystals. Recrystallization from acetone yielded 11α-hydroxy-3,5-seco-A-nor-pregnane-5,20-dione-3-oic acid 3,11-lactone, M.P. 253–256°; $[\alpha]_D^{25}+193.3°$ (c.=1, in chloroform).

Example 7

A methanolic solution of 7.5 g. of 11α-hydroxy-3,5-seco-A-nor-pregnane-5,20-dione-3-oic acid 3,11-lactone was treated with one equivalent of 10 N sodium hydroxide solution and then evaporated to dryness. Sodium phenylacetate (26 g.) was added to the so-obtained sodium salt and the mixture pyrolyzed at 295° for two hours in vacuo. The crude sublimate was chromatographed on a silica-gel column and eluted with 10 percent ethylacetate in benzene. The amorphous solid 11α-hydroxy-10α-desA-pregnane-5,20-dione was first eluted from the column. IR-spectrum in chloroform: 3620 and 3600 cm.$^{-1}$ (—OH); 1706 cm.$^{-1}$ (carbonyl group) NMR-spectrum in deuterochloroform: a doublet for 10α-CH$_3$ at 73.5 and 80.5 c.p.s. downfield from TMS at 60 mc./sec. Further elution of the column with 10 percent ethylacetate in benzene yielded crystalline 11α-hydroxy-10β-desA-pregnane-5,20-dione which was recrystallized from methylene chloride-petroleum ether, M.P. 150–152°; $[\alpha]_D^{25}+84.0°$ (c.=0.5 in absolute ethanol).

Example 8

To a solution of 100 mg. of methanesulfonylchloride in 0.7 ml. of pyridine, there was added 100 mg. of 11α-hydroxy-10β-desA-pregnane-5,20-dione. The mixture was then allowed to stand overnight at 2° (in a refrigerator), then was diluted with water (100 ml.) and extracted with chloroform (3×150 ml.) and methylene chloride (100 ml.). The combined organic extracts were washed with water, 1 N hydrochloric acid and again with water, then dried over anhydrous sodium sufate and evaporated in vacuo. The crystalline residue was recrystallized from ether, giving 11α-hydroxy-10β-desA-pregnane-5,20-dione methanesulfonate, M.P. 139–140°; $[\alpha]_D^{25}+46°$ (c.=0.5 in absolute ethanol).

Example 9

A solution of 200 mg. of 11α-hydroxy-10β-desA-pregnane-5,20-dione methanesulfonate in 50 ml. of dimethylformamide was refluxed for eight hours and then evaporated to dryness. The residue was chromatographed on a Florisil (absorbent) column. Elution with 2 percent ethylacetate/benzene and evaporation of the eluant yielded desA-pregn-9-ene-5,20-dione in the form of colorless needles, M.P. 111–113°. It was shown by mixed melting point to be identical with a sample of the same compound prepared as described in Example 12.

Example 10

To a solution of 20 g. of 11α-hydroxy-progesterone in 150 ml. of pyridine maintained at 0°, there was added 6 ml. of methanesulfonylchloride, and the reaction mixture allowed to stand overnight at 0°. It was then diluted with a large excess of water and extracted with chloroform. The organic extracts were washed with 2 N hydrochloric acid and water, then dried over anhydrous sodium sulfate and evaporated in vacuo. The solid residue was recrystallized from methanol to give 11α-mesyloxy-progesterone, M.P. 159.5–160°; $[\alpha]_D^{25}+145.6$ (c.=1, chloroform).

Example 11

A solution of 12 g. of 11α-mesyloxy-progesterone in 300 ml. of methylene chloride/ethyl acetate (2:1) was treated with ozone at −70° until the solution become blue in color. The excess of ozone was removed by bubbling oxygen through the reaction mixture for five minutes. Methylene chloride was then removed under reduced pressure, and the solution diluted with ethyl acetate to 200 ml. After addition of 12 ml. of 30 percent aqueous hydrogen peroxide, the reaction mixture was then allowed to stand overnight at 2° (i.e., in the refrigerator), then evaporated to a volume of 75 ml. and diluted with 125 ml. of benzene. The aqueous solution, obtained by extraction with 8 portions of 75 ml. 2 N sodium carbonate followed by combining the aqueous extracts was acidified with cold concentrated hydrochloric acid to pH 2 and extracted with methylene chloride. This extract was dried over anhydrous sodium sulfate and evaporated in vacuo to dryness. The residue crystallized when triturated with ether-acetone mixture, yielding crude 11α-mesoxy-5,20-dioxo-3,5-seco-A-norpregnan-3-oic acid. After recrystallization from acetone-petroleum ether, M.P. 152–153°; $[\alpha]_D^{25}+47.9°$ (c.=1, chloroform).

Example 12

A solution of 6 g. of 11α-mesoxy-5,20-dioxo-3,5-seco-A-norpregnan-3-oic acid in 150 ml. of methanol was mixed with a solution of 1.5 g. of sodium carbonate in 55 ml. of water. The mixture was then transferred into a 1 liter sublimation flask, and evaporated to dryness. To the thus formed sodium salt, 20 g. of sodium phenyl acetate is added, and after closing the top part of the apparatus, this mixture was pyrolyzed at 290° and 0.02 mm. for four hours. The product, which collects on the cold finger, was dissolved in ether and filtered. The filtrate was then evaporated to dryness. Purification of the residue by chromatography on a 40 g. silica-gel column (benzene eluant) gave crystalline desA-pregn-9-ene-5,20-dione; M.P. 111–113° (after recrystallization from ether). $[\alpha]_D^{25}+56.8°$ (c.=0.25 percent in methanol).

Example 13

To a solution of 1.2 g. of desA-pregn-9-ene-5,20-dione in 20 ml. of methanol maintained at 0°, there was slowly added a cooled solution of 1.2 g. of sodium borohydride in 22 ml. methanol, and the resultant mixture was left for 72 hours at 0°. It was then diluted with 100 ml. of water and extracted with four 100 ml. portions of chloroform. The extract was dried over anhydrous sodium sulfate and evaporated in vacuo, yielding a colorless oily product. This product was dissolved in 250 ml. of chloroform and 6 g. of manganese dioxide was added to the solution which was then stirred for 72 hours at room temperature, filtered and the filtrate evaporated to dryness in vacuo. The residue was chromatographed on a silica-gel column and the eluates with 5 percent ethyl acetate in benzene, after concentration gave crystalline 20β-hydroxy-desA-pregn-9-en-5-one which upon recrystallization from methylene chloride-petroleum ether formed colorless needles, M.P. 122–123°; $[\alpha]_D^{25}$ —33° (c.=0.5, absolute ethanol).

Example 14

A suspension of 262 mg. of 5 percent rhodium on alumina catalyst in a mixture of 26 ml. of 95 percent ethanol and 5.25 ml. of 2 N aqueous sodium hydroxide was hydrogenated at room temperature and atmospheric pressure. To this was added a solution of 262 mg. of 20β-hydroxy-desA-pregn-9-en-5-one in 15 ml. of 95 percent ethanol, and the reaction mixture then hydrogenated at room temperatude and atmospheric pressure. After one mole equivalent of hydrogen was absorbed, the reaction was stopped, and the catalyst was separated by filtration. After standing overnight the filtrate was concentrated in vacuo. To the residue was added 1 ml of glacial acetic acid and it was then dissolved in 1 liter of ether. The cloudy solution was washed with 2 N aqueous sodium carbonate solution, then with water, then dried over anhydrous sodium sulfate and evaporated to dryness in vacuo. It yielded a colorless oil, which was chromatographed on a silica-gel column using 1 percent ethyl acetate in benzene as the elutant. First eluted was 20β-hydroxy-10α-desA-pregnan-5-one, M.P. 107–108° after recrystallization from methylene chloride/petroleum ether. R.D. (in methanol); $[\alpha]_{500}$—25.3°; $[\alpha]_{400}$—89°; $[\alpha]_{350}$—274°; $[\alpha]_{305}$—1335°; $[\alpha]_{300}$—1165°.

Further elution yielded 20β-hydroxy-9β,10β-desA-pregnan-5-one as a colorless oil. R.D. (in methanol); $[\alpha]_{500}$—14.8°; $[\alpha]_{400}$—4.4°; $[\alpha]_{350}$+22.2°; $[\alpha]_{310}$+2148°.

Example 15

A suspension of 262 mg. of 5 percent rhodium on alumina catalyst in a mixture of 2 ml. of 3 N aqueous hydrochloric acid and 18 ml. 95 percent ethanol was hydrogenated at room temperature and atmospheric pressure. A solution of 262 mg. of 20β-hydroxy-desA-pregn-9-en-5-one in 5 ml. of absolute ethanol was introduced into the hydrogenation flask, and the reaction mixture was then hydrogenated at room temperature and atmospheric pressure. After one mole-equivalent of hydrogen was absorbed, the reaction was stopped, the catalyst was separated by filtration, and the filtrate neutralized with 2 N aqueous sodium hydroxide solution. An excess of 5 ml. of 2 N aqueous sodium hydroxide was added and the solution allowed to stand overnight. Ethanol was then removed by evaporation at reduced pressure, and after addition of 1 ml. of glacial acetic acid, it was extracted with 1 liter of ether. The extract was washed with 2 N aqueous sodium carbonate solution, then with water, dried and concentrated in vacuo. It gave a colorless oil, which was chromatographed on a silica-gel column using 2 percent ethyl acetate in benzene as the elutant. The first fractions of the eluate yielded, upon concentration, 20β-hydroxy-10α-desA-pregnan-5-one. From the immediately subsequent fraction, 20β-hydroxy-9β,10β-desA-pregnan-5-one was obtained. Both products were identical with the same compounds obtained in Example 14.

Example 16

20β-hydroxy-9β,10α-pregn-4-en-3-one is prepared by condensation of 20β-hydroxy-9β,10β-desA-pregnan-5-one with methyl vinyl ketone according to the procedure of Example 5. The product melts at 176.5–178.5°;

$[\alpha]_D^{25}$—143°

(chloroform).

Example 17

A medium is prepared of 20 g. of Edamine enzymatic digest of lactalbumin, 3 g. of corn steep liquor and 50 g. of technical dextrose diluted to 1 liter with tap water and adjusted to a pH of 4.3–4.5. Twelve liters of this sterilized medium is inoculated with Rhizopus nigricans minus strain (A.T.C.C. 6227b) and incubated for 24 hours at 28° using a rate of aeration and stirring such that the oxygen uptake is 6.3–7 millimoles per hour per liter of $Na_2SO_3$ according to the method of Cooper et al., Ind. Eng. Chem., 36, 504 (1944). To this medium containing a 24 hour growth of Rhizopus nigricans minus strain, 6 g. of 17α-acetoxy-progesterone in 150 ml. of acetone is added. The resultant suspension of the steroid in the culture is incubated under the same conditions of temperature and aeration for an additional 24 hour period after which the beer and mycelium are extracted. The mycelium is then filtered, washed twice, each time with a volume of acetone approximately equal in volume to the mycelium, extracted twice, each time with a volume of methylene chloride approximately equal to the volume of the mycelium. The acetone and methylene chloride extracts including solvent are then added to the beer filtrate. The mixed extracts and beer filtrate are then extracted successively with 2 portions of methylene chloride, each portion being ½ the volume of the mixed extracts and beer filtrate, and then with 2 portions of methylene chloride, each portion being ¼ the volume of the mixed extracts and beer filtrate. The combined methylene chloride extracts are then washed with 2 portions of a 2 percent aqueous solution of sodium bicarbonate, each portion being 1/10 the volume of the combined methylene chloride extracts. The methylene chloride extracts are then dried with about 3–5 g. of anhydrous sodium sulfate per liter of solvent, and then filtered. The solvent is then removed from the filtrate by distillation, and the residue is dissolved in a minimum of methylene chloride, filtered and the solvent evaporated from the filtrate. The resulting crystals are then dried and washed five times, each time with a 5 ml. portion of ether per gram of crystal. The crystals are then recrystallized from ether giving 17α-acetoxy-11α-hydroxy - progesterone. 17α - acetoxy - 11α-mesoxy-progesterone is prepared by treatment of 17α-acetoxy-11α-hydroxy-progesterone with methanesulfonyl chloride, according to the procedure of Example 10.

Example 18

17α-acetoxy-5,20-dioxo - 11α - mesoxy-A-nor-3,5-seco-pregnan-3-oic acid is prepared by ozonolysis of 17α-acetoxy-11α-mesoxy-progesterone, according to the procedure of Example 11.

Example 19

17α-acetoxy-desA-pregn-9-ene-5,20 - dione is prepared from 17α-acetoxy-5,20-dioxo-11α-mesoxy-A-nor-3,5-seco-pregnan-3-oic acid by conversion of the latter to its sodium salt followed by pyrolysis, according to the procedure of Example 12.

Example 20

17α-acetoxy-20β-hydroxy-desA-pregn-9-en-5-one is prepared from 17α-acetoxy-desA-pregn-9-en-5,20-dione by reduction and reoxidation according to the procedure of Example 13.

Example 21

17α-acetoxy-20β-hydroxy-9β,10β-desA-pregnan-5-one is prepared from 17α-acetoxy-20β-hydroxy-desA-pregn - 9-en-5-one by hydrogenation under acidic conditions in the presence of a rhodium catalyst, according to the procedure of Example 15.

Example 22

17α - acetoxy-20β-hydroxy-9β,10α-pregn-4-en-3-one is prepared by condensing methyl vinyl ketone with 17α-acetoxy-20β-hydroxy-9β,10β-desA-pregnan-5-one according to the procedure of Example 5 except instead of conducting the condensation in absolute ethanol and catalyzing it with sodium ethoxide, the condensation is conducted in acetic acid and is catalyzed with p-toluene sulfonic acid.

Example 23

20β - hydroxy - 4 - methyl-9-β,10α-pregn-4-3-one is prepared by condensing 20β-hydroxy-9β,10β-desA-pregnan-5- one and ethyl vinyl ketone according to the procedure of Example 5.

Example 24

17β-hydroxy-5-oxo-3,5-seco-A-nor-androstan-3-oic acid is prepared by ozonolysis of testosterone according to the procedure of Example 1.

Example 25

17β - hydroxy - 10α - desA-androstan-5-one and 17β-hydroxy-10β-desA-androstan-5-one are prepared from 17β-hydroxy-5-oxo-3,5-seco-A-norandrostan-3-oic acid by conversion of the latter to its sodium salt followed by pyrolysis, according to the procedure of Example 2.

Example 26

17β-hydroxy-desA-androst-9-en-5-one is prepared from 17β-hydroxy-10α-desA-androstan-5-one by bromination followed by dehydrobromination, according to the procedure of Example 3.

Example 26a

DesA-androst-9-ene-5,17-dione is prepared from 17β-hydroxy-10α-desA-androst-9-en-5-one by oxidation of the latter with a 2 percent chromic acid solution in 90 percent acetic acid. The so-obtained desA-antrost-9-ene-5,17-dione is recrystallized from cyclohexane and melts at 123–123.5°; $[\alpha]_{589}^{25}=+83°$ (c.=0.1021, dioxane).

Example 27

A solution of 236 mg. of 17β-hydroxy-desA-androst-9-en-5-one in 40 ml. 95 percent ethanol and 5.25 ml. 2 N aqueous sodium hydroxide solution was hydrogenated with one mole equivalent of hydrogen over 236 mg. of prereduced 5 percent rhodium on alumina catalyst. After separation of catalyst, the solution was concentrated in vacuo to dryness, and the residue taken up in one liter of ether. The ether solution was washed with water, dried over anhydrous sodium sulfate and evaporated to dryness in vacuo. From the residue 17β-hydroxy-9β,10β-desA-androstan-5-one was obtained by crystallization. M.P. 144.5–145°; $[\alpha]_D^{25}-22°$ (c.=0.103; dioxane). The 17β-acetate (i.e. 17β-acetoxy-9β,10β-desA-androstan-5-one) is obtained by acetylation of testosterone followed by ozonolysis, pyrolysis, bromination and dehydrobromination, and reduction according to the methods of Examples 24, 25, 26 and 27 respectively, and melts at 118–119°; $[\alpha]_D^{25}-28°$ (c.=0.103; dioxane).

Example 28

A solution of 238 mg. of 17β-hydroxy-9β,10β-desA-androstan-5-one, 1 ml. of ethylene glycol and catalytic amount of p-toluene sulfonic acid in 100 ml. of anhydrous benzene was slowly distilled until no more water was coming over. The solution was then concentrated in vacuo to a small volume, and 17β-hydroxy-9β,10β-desA-androstan-5-one 5-ethylene ketal was obtained from the residue by crystallization. M.P. 115–116°; $[\alpha]_D^{25}-9°$ (c.=0.0987; dioxane).

Example 29

To a solution of 282 mg. of 17β-hydroxy-9β,10β-desA-androstan-5-one-5-ethylene ketal in 50 ml. of methylene chloride was added 1 equivalent of 2 percent chromic acid in pyridine, and the reaction mixture then stirred overnight. The reaction mixture was then washed with 10 percent aqueous sodium hydrogen sulfite, 2 N aqueous sodium carbonate, water, then dried over anhydrous sodium sulfate and concentrated in vacuo to dryness. Crystallization of the residue gave 9β,10β-desA-androstane-5,17-dione 5-mono-ethylene ketal. Splitting of the ketal in acetone solution in the presence of a catalytic amount of p-toluene sulfonic acid gives 9β,10β-desA-androstane-5,17-dione which melts, after recrystallization from cyclohexane, at 77.5–78°; $[\alpha]_D^{25}+55°$ (c.=0.107; dioxane).

Example 30

To a preformed solution of one mole equivalent of prop-1'-inyl lithium in 100 ml. of anhydrous liquid ammonia was added tetrahydrofuran solution of 200 mg. of 9β,10β-desA-androstane-5,17-dione 5-mono-ethylene ketal, and the reaction mixture stirred for two hours. After addition of one gram of ammonium chloride, cooling was discontinued, and the reaction mixture allowed to evaporate. The residue was extracted with methylene chloride, the extract was washed with water, dried over anhydrous sodium sulfate and evaporated. The residue was dissolved in 20 ml. of acetone and the catalytic amount of p-toluenesulfonic acid added, and the solution was refluxed for two hours, then poured in water and extracted in methylene chloride. The methylene chloride extract was washed with water, then dried over anhydrous sodium sulfate and evaporated to dryness in vacuo. Crystallization of the residue gave 17α - (prop-1'-inyl) - 17β-hydroxy-9β,10β-desA-androstan-5-one.

Example 31

17α - (prop-1'-inyl) - 17β-hydroxy-9β,10α-androstan-4-en-3-one is prepared by condensing methyl vinyl ketone with 17α-(prop-1'-inyl)-17β-hydroxy-9β,10β-desA-androstan-5-one according to the procedure of Example 5. The product melts at 164–165°.

Example 32

To a stirred solution of one mole equivalent of 2-methyl-prop-2-enyl magnesium bromide in 100 ml. of ether at room temperature was added dropwise a solution of 280 mg. of 9β,10β-desA-androstane-5,17-dione 5-mono-ethylene ketal in 100 ml. of tetrahydrofuran. The reaction mixture was refluxed for one hour. After cooling in an ice-salt bath, a saturated solution of sodium sulfate was slowly added to decompose the Grignard complex. This was followed by addition of anhydrous sodium sulfate. The solution was separated by filtration and concentrated in vacuo to dryness. The solution of the residue and of a catalytic amount of p-toluene sulfonic acid in 20 ml. of acetone was refluxed for two hours, then poured in water and extracted in methylene chloride. Methylene chloride extract was washed with water, dried over anhydrous sodium sulfate and evaporated to dryness. From the residue 17α-(2'-methyl-prop-2'-enyl)-17β-hydroxy-9β,10β-desA-androstan-5-one was obtained.

Example 33

17α - (2' - methyl - prop - 2' - enyl) - 17β - hydroxy-9β,10α-androst-4-en-3-one is prepared from 17α-(2'-methyl - prop - 2' - enyl) - 17β - hydroxy - 9β,10β - desA-androstan-5-one by condensation of the latter with methyl vinyl ketone according to the procedure of Example 5. The product melts at 106–108°.

Example 34

16α-acetoxy-20-ethylenedioxy-pregn-4-en-3-one is prepared by acetylation of 16α-hydroxy-20-ethylenedioxy-pregn-4-ene-3,20-dione with one equivalent of acetic anhydride in pyridine solution at room temperature for 2 hours, followed by concentration to dryness in vacuo. 16α - acetoxy - 20 - ethylenedioxy - 5 - oxo - 3,5 - seco-A-norpregnan-3-oic acid is prepared by ozonolysis of 16α-acetoxy-20-ethylenedioxy-pregn-4-en-3-one according to the procedure of Example 1.

Example 35

16α - acetoxy-20-ethylenedioxy-10α-desA-pregnan-5-one and 16α-acetoxy - 20-ethylenedioxy - 10β-desA-pregnan-5-one are prepared from 16α-acetoxy-20-ethylenedioxy-5-oxo-3,5-seco-A-norpregnan-3-oic acid by conversion of the latter to its sodium salt followed by pyrolysis (according to the procedure of Example 2) and reacetylation with acetic anhydride and pyridine.

Example 36

16α - acetoxy - 20 - ethylenedioxy - desA - pregn - 9-en-5-one is prepared from 16α-acetoxy-20-ethylenedioxy-10α-desA-pregnan-5-one by bromination followed by dehydrobromination, according to the procedure of Example 3.

Example 37

16α - acetoxy - 20 - ethylenedioxy - 9β,10β - desA-pregnan-5-one is prepared from 16α-acetoxy-20-ethylenedioxy-desA-pregn-9-en-5-one by hydrogenation under basic conditions in the presence of a rhodium catalyst, according to the procedure of Example 14.

Example 38

16α - hydroxy - 20 - ethylenedioxy - 9β,10α - pregn-4-en-3-one is prepared by condensing 16α-acetoxy-20-ethylenedioxy - desA - 9β,10β-pregnan-5-one with methyl vinyl ketone according to the procedure of Example 5.

Example 39

3β - hydroxy - 16α - methyl - pregn - 5 - en - 20 - one ethylene ketal is prepared by ketalization of 3β-hydroxy-16α-methyl-pregn-5-en-20-one in benzene solution with ethylene glycol using p-toluenesulfonic acid as catalyst. Pyridine-chromic acid oxidation of the so-obtained 3β-hydroxy - 16α - methyl-pregn-5-en-20-one ethylene ketal yields 16α-methyl-20-ethylenedioxy-pregn-4-en-3-one. 16α-methyl - 20 - ethylenedioxy - 5 - oxo - 3,5 - seco - A-norpregnane-3-oic acid is prepared by ozonolysis of 16α-methyl-20-ethylene-dioxy-pregn-4-en-3-one according to the procedure of Example 1.

Example 40

16α - methyl - 20 - ethylenedioxy - 10α - desA - pregnan-5 - one and 16α - methyl - 20 - ethylenedioxy - 10β - desA-pregnan-5-one are prepared from 16α-methyl-20-ethylenedioxy-5-oxo-3,5-seco-A-norpregnan-3-oic acid by conversion of the latter to its sodium salt followed by pyrolysis, according to the procedure of Example 2.

Example 41

16α - methyl - 20 - ethylenedioxy - desA - pregn - 9-en-5-one is prepared from 16α-methyl-20-ethylenedioxy-10α-desA-pregnan-5-one by bromination followed by dehydrobromination, according to the procedure of Example 3.

Example 42

16α - methyl - 20 - ethylenedioxy - 9β,10β - desA-pregnan-5-one is prepared from 16α-methyl-20-ethylenedioxy-desA-pregn-9-en-5-one by hydrogenation under basic conditions in the presence of a rhodium catalyst, according to the procedure of Example 14.

Example 43

16α - methyl - 20 - ethylenedioxy - 9β,10α - pregn - 4-en-3-one is prepared by condensing 16α-methyl-20-ethylenedioxy-9β,10β-desA-pregnan-5-one with methyl vinyl ketone, according to the procedure of Example 5.

Example 44

21 - acetoxy - 11α - hydroxy - 20 - ethylenedioxy-pregn-4-en-3-one is prepared by microbiological treatment of 21-acetoxy-20-ethylenedioxy - pregn-4-en-3-one, according to the procedure of Example 17. 21-acetoxy-11α-mesoxy-20-ethylenedioxy-pregn-4-en-3-one is prepared by treatment of 21-acetoxy-11α-hydroxy-20-ethylenedioxy-pregn-4-ene-3-one with methanesulfonyl chloride, according to the procedure of Example 10.

Example 45

21 - acetoxy - 11α - mesoxy - 20 - ethylenedioxy - 5-oxo-3,5-seco-A-norpregnan-3-oic acid is prepared by ozonolysis of 21-acetoxy-11α-mesoxy-20-ethylenedioxy-pregn-4-en-3-one, according to the procedure of Example 11.

Example 46

21 - acetoxy - 20 - ethylenedioxy - desA - pregn - 9-en-5-one is prepared from 21-acetoxy-20-ethylenedioxy-11α-mesoxy-3,5-seco-A-norpregnan-3-oic acid by conversion of the latter to its sodium salt followed by pyrolysis, according to the procedure of Example 12, except that the crude product is reacetylated by treatment with acetic anhydride/pyridine prior to its being worked-up.

Example 47

21 - acetoxy - 20 - ethylenedioxy - 9β,10b - desA-pregnan-5-one is prepared from 21-acetoxy-20-ethylenedioxy-desA-pregn-9-en-5-one by hydrogenation under acidic conditions in the presence of a rhodium catalyst, according to the procedure of Example 15.

Example 48

21 - hydroxy - 20 - ethylenedioxy - 9β,10α - pregn-4-en-3-one is prepared from 21-acetoxy-20-ethylenedioxy-9β,10β-desA-pregnan-5-one by condensing the latter with methyl vinyl ketone, according to the procedure of Example 22.

Example 49

11α-mesoxy-16α,17α-isopropylidenedioxy - progesterone is prepared by treatment of 11α-hydroxy-16α,17α-isopropylidenedioxy-progesterone with methane sulfonyl chloride, according to the procedure of Example 10.

Example 50

5,20 - dioxo - 11α - mesoxy - 16α,17α - isopropylidenedioxy-3,5-seco-A-norpregnan-3-oic acid is prepared by ozonolysis of 11α-mesoxy-16α,17α-isopropylidenedioxy-progesterone, according to the procedure of Example 11.

Example 51

16α,17α - isopropylidenedioxy - desA-pregn-9-en-5,20-dione is prepared from 5,20-dioxo-11α-mesoxy-16α,17α-isopropylidenedioxy-3,5-seco-A-norpregnan-3-oic acid by conversion of the latter to its sodium salt, followed by pyrolysis according to the procedure of Example 12.

Example 52

20β - hydroxy - 16α,17α - isopropylidenedioxy - desA-pregn-9-en-5-one is prepared from 16α,17α-isopropylidenedioxy-desA-pregn-9-ene-5,20-dione by reduction and reoxidation, according to the procedure of Example 13.

Example 53

20β - hydroxy - 16α,17α - isopropylidenedioxy-9β,10β-desA-pregnan-5-one is prepared from 20β-hydroxy-16α,17α-isopropylidenedioxy-desA-pregn-9-en-5-one by hydrogenation according to the procedure of Example 14.

Example 54

20β - hydroxy - 16α,17α - isopropylidenedioxy-9β,10α-pregn-4-en-3-one is prepared by condensing methyl vinyl ketone with 20β - hydroxy-16α,17α-isopropylidenedioxy-desA-9β,10β-pregnan-5-one according to the procedure of Example 5.

Example 55

7α,17α - dimethyl-17β-hydroxy-5-oxo-3,5-seco-A-norandrostan-3-oic acid is prepared from 7α,17α-dimethyl-testosterone by ozonolysis of the latter, according to the procedure of Example 1.

Example 56

7α,17α - dimethyl-17β-hydroxy-10α-desA-androstan-5-one and 7α,17α-dimethyl 17β-hydroxy-10β-desA-androstan - 5 - one are prepared from 7α,17α - dimethyl - 17β-hydroxy-5-oxo-3,5-seco-A-norandrostan-3-oic acid by conversion of the latter to its sodium salt followed by pyrolysis, according to the procedure of Example 2.

Example 57

7α,17α - dimethyl - 17β-hydroxy-desA-androst-9-en-5-one is prepared from 7α,17α-dimethyl-17β-hydroxy-10α-desA-androstan-5-one by bromination followed by dehydrobromination, according to the procedure of Example 3.

Example 58

7α,17α - dimethyl-17β-hydroxy-desA-9β,10β-androstan-5-one is prepared from 7α,17α-dimethyl-17β-hydroxy-desA-androst-9-en-5-one by hydrogenation in the presence of a rhodium catalyst, according to the procedure of Example 4.

Example 59

7α,17α-dimethyl-9β,10α-testosterone is prepared from 7α,17α - dimethyl-17β-hydroxy-desA-9β,10β-androstan-5-one by condensing the latter with methyl vinyl ketone, according to the procedure of Example 5.

Example 60

11α-mesoxy-17α-methyl-progesterone is prepared from 11α-hydroxy-17α-methyl-progesterone by treatment of the latter with methane sulfonyl chloride, according to the procedure of Example 10.

Example 61

11α - mesoxy - 17α-methyl-5,20-dioxo-3,5-seco-A-nor-pregnan-3-oic acid is prepared from 11α-mesoxy-17α-methyl-progesterone by ozonolysis of the latter, according to the procedure of Example 11.

Example 62

17α - methyl - desA-pregn-9-ene-5,20-dione is prepared from 11α - mesoxy-17α-methyl-5,20-dioxo-3,5-seco-A-nor-pregnan-3-oic acid by conversion of the latter to its sodium salt followed by pyrolysis, according to the procedure of Example 12.

Example 63

20β-hydroxy-17α-methyl-desA-pregn-9-en-5-one is prepared from 17α - methyl - desA-pregn-9-en-5,20-dione according to the procedure of Example 13.

Example 64

20β-hydroxy-17α-methyl-9β,10β-desA-pregnan-5-one is prepared from 17α-methyl-20β-hydroxy-desA-pregnan-9-ene-5-one according to the procedure of Example 15.

Example 65

20β - hydroxy - 17α-methyl-9β,10α-pregn-4-en-3-one is prepared by condensing 17α-methyl-20β-hydroxy-9β,10β-desA-pregnan-5-one with methyl vinyl ketone, according to the procedure of Example 4.

Example 66

17α - methyl - 17β-hydroxy-5-oxo-3,5-seco-A-norandrostan-3-oic acid is prepared from 17α-methyl-testosterone by ozonolysis, according to the procedure of Example 1. The so-obtained product melts at 191–194°; $[\alpha]_D^{25}+9.8°$ (c.=1, chloroform).

Example 67

17α-methyl-17β-hydroxy-10α-desA-androstan-5-one and 17α - methyl-17β-hydroxy-10β-desA-androstan-5-one are prepared from 17α-methyl-17β-hydroxy-5-oxo-3,5-seco-A-norandrostan-3-oic acid by conversion of the latter to its sodium salt followed by pyrolysis, according to the procedure of Example 2. The so-obtained 17α-methyl-17β-hydroxy - 10α - desA - androstan-5-one melts at 96–97°; $[\alpha]_D^{25}-28.2°$ (c.=0.5, chloroform) and the 10β-isomer melts at 165–167°; $[\alpha]_D^{25}-19.8°$ (c.=0.5, chloroform).

Example 68

17α - methyl - 17β-hydroxy-desA-androst-9-en-5-one is prepared from 17α-methyl-17β-hydroxy-10α-desA-androstan-5-one by bromination followed by dehydrobromination, according to the procedure of Example 3.

Example 69

17α-methyl-17β-hydroxy-desA-9β,10β - androstan-5-one is prepared from 17α-methyl-17β-hydroxy-desA-androst-9-en-5-one by hydrogenation of the latter, according to the procedure of Example 4. The product melts, upon recrystallization from ethyl acetate-petroleum ether, at 94.5–95.5° $[\alpha]_D^{25}-36°$ (c.=0.0998, dioxane).

Example 70

17α-methyl-9β,10α-testosterone is prepared from 17α-methyl-17β-hydroxy-desA-9β,10β-androstan-5-one by condensation of the latter with methyl vinyl ketone, according to the procedure of Example 5. The product melts at 128–129°.

Example 71

A solution of 6 g. of 11α,20β-diacetoxy-pregn-4-en-3-one in 100 ml. methylene chloride and 50 ml. of ethylacetate was ozonized at −70°. After methylene chloride was removed by distillation in vacuo, the residual solution was diluted to 100 ml. with ethylacetate. To this 5 ml. of 30 percent hydrogen peroxide was added and left overnight at room temperature. The reaction mixture was concentrated to dryness in vacuo, the residue taken up in 1 liter of ether, and the resulting solution extracted 10 times with 50 ml. portions of 2 N aqueous sodium carbonate. The carbonate extract was then acidified with ice-cold concentrated hydrochloric acid. The precipitated product was separated by filtration, and crystallized to give 11α,20β-diacetoxy-5-oxo,3,5-seco-A-nor-pregnan-3-oic acid.

Example 72

A methanolic solution of 5 g. of 11α,20β-diacetoxy-5-oxo-3,5-seco-A-nor-pregnan-3-oic acid was treated with one-half mole equivalent of sodium carbonate, and evaporated to dryness in vacuo. Potassium acetate (5 g.) was added to the residue which was then pyrolyzed at 295° and 0.02 mm. The sublimate was chromatographed on a silica-gel column to give 11α,20β-diacetoxy-10β-desA-pregnan-5-one.

Example 73

Bromination and dehydrobromination starting with 11α,20β-diacetoxy-10β-desA-pregnan-5-one according to the procedure of Example 3, gave 11α,20β-diacetoxy-desA-pregn-9-en-5-one.

Example 74

Hydrogenation of 11α,20β-diacetoxy-desA-pregn-9-en-5-one in ethanolic hydrochloric acid over 5 percent rhodium on alumina catalyst at room temperature and atmospheric pressure according to the procedure of Example 15 gave 11α,20β-diacetoxy-9β,10β-desA-pregnan-5-one.

Example 75

11α,20β-diacetoxy-9β,10β-desA-pregnan-5-one was hydrolyzed in methanol solution with one mole equivalent of potassium carbonate to give 11α,20β-dihydroxy-9β,10β-desA-pregnan-5-one.

Example 76

Condensation of 11α,20β-dihydroxy-9β,10β-desA-pregnan-5-one with methyl vinyl ketone according to the procedure of Example 5 gave 11α,20β-dihydroxy-9β,10α-pregn-4-en-3-one.

Example 77

A solution of 3 g. of 17α-ethyl-17β-hydroxy-androsta-1,4-dien-3-one in 75 ml. of methylene chloride and 25 ml. of ethyl acetate was ozonized at −70° till it became blue. After evaporation to dryness, the residue was dissolved in 100 ml. of glacial acetic acid containing 5 ml. of 30 percent hydrogen peroxide, and set at room temperature for 2 days. The reaction mixture was concentrated to dryness and the residue dissolved in one liter of ether. The ether solution was then extracted 10 times with 25 ml. portions of aqueous 2 N sodium carbonate solution, and the carbonate extracts were acidified with ice-cold concentrated hydrochloric acid. The non-crystalline precipitate containing 17α-ethyl-17β-hydroxy-10α-carboxy-desA-androstan-5-one was separated by filtration and dried, then dissolved in 135 ml. of absolute ethanol, and after addition of 9 ml. of aqueous 2 N sodium hydroxide, boiled for 1 hr. The reaction mixture was concentrated in vacuo to a small volume, and diluted with 1750 ml. of ether. The ether solution was washed with water, dried over anhydrous sodium sulfate, and concentrated in vacuo to dryness. The residue was crystallized from ether-petroleum ether, to give 17α-ethyl-17β-hydroxy-10α-desA-androstan-5-one, M.P. 89–90°.

Example 78

3-(17β - hydroxy-5-oxo-3,5-seco-A-nor-androstan-17α-yl-3-oic acid)-propionic acid lactone is prepared by ozonolysis of 3-(3-oxo-17β-hydroxy-androst-4-en-17α-yl)-propionic acid lactone, according to the procedure of Example 1.

Example 79

3-(17β-hydroxy - 5 - oxo-10α-desA-androstan-17α-yl)-propionic acid lactone and 3-(17β-hydroxy-5-oxo-10β-desA-androstan-17α-yl)-propionic acid lactone are prepared from 3-(17β-hydroxy-5-oxo,3,5-seco-A-nor-androstan-17α-yl-3-oic acid)-propionic acid lactone by conversion of the latter to its sodium salt followed by pyrolysis, according to the procedure of Example 2.

Example 80

3-(17β-hydroxy - 5 - oxo-desA-androst-9-en-17α-yl)-propionic acid lactone is prepared from 3-(17β-hydroxy-5-oxo-10α-desA-androstan-17α-yl)-propionic acid lactone by bromination followed by dehydrobromination, according to the procedure of Example 3.

Example 81

3-(17β-hydroxy - 5 - oxo-9β,10β-desA-androstan-17α-yl)-propionic acid lactone is prepared from 3-(17β-hydroxy-5-oxo-desA-androst-9-en-17α-yl)-propionic acid lactone by hydrogenation in the presence of a rhodium catalyst, according to the procedure of Example 4.

Example 82

3-(17β-hydroxy - 3 - oxo-9β,10α-androst-4-en-17α-yl)-propionic acid lactone is prepared by condensing 3-(17β-hydroxy-5-oxo-9β,10β - desA-androstan-17α-yl)-propionic acid lactone with methyl vinyl ketone, according to the procedure of Example 5.

Example 83

17α,20;20,21 - bis - methylenedioxy - 11α - mesyloxy-pregn-4-en-3-one is prepared by treatment of 17α,20;20,21-bis-methylenedioxy-11α-hydroxy pregn-4-en-3-one with methanesulfonyl chloride according to the procedure of Example 10.

Example 84

17α,20;20,21 - bis - methylenedioxy - 11α - mesyloxy-5-oxo-3,5-seco-A-norpregnan-3-oic acid is prepared by ozonolysis of 17α,20;20,21-bis-methylenedioxy-11α-mesyloxy-pregn-4-en-3-one according to the procedure of Example 11.

Example 85

17α,20;20,21 - bis - methylenedioxy-desA-pregn-9-en-5-one is prepared from 17α,20;20,21-bis-methylenedioxy-11α-mesyloxy-5-oxo-3,5-seco - A - norpregnan-3-oic acid by conversion of the latter to its sodium salt followed by pyrolysis, according to the procedure of Example 12.

Example 86

17α,20;20,21-bis-methylenedioxy-9β,10β - desA - pregnan-5-one is prepared from 17α,20;20,21-bis - methylenedioxy-desA-pregn-9-en-5-one by hydrogenation in the presence of a rhodium catalyst according to the procedure of Example 14.

Example 87

17α,20;20,21 - bis-methylenedioxy - 9β,10α-pregn-4-en-3-one is prepared by condensing methylvinyl ketone with 17α,20;20,21 - bis - methylenedioxy - 9β,10β - desA-pregnan-5-one, according to the procedure of Example 5.

Example 88

20β - hydroxy-9β,10α - pregna-1,4-dien-3-one was prepared by condensation of 20β-hydroxy - 9β,10β-desA-pregnan-5-one with 1 equivalent of methyl ethinyl ketone in boiling benzene solution, catalyzed by sodium hydride.

Example 89

One ml. of Jones Reagent (0.004 mole $CrO_3$) is added to 200 mg. of 17β-hydroxy-9β,10β-desA-androstan-5-one in 20 ml. of acetone at −10°. The mixture is then left for 15 minutes at room temperature, and 5 ml. of ethanol then added. The resulting suspension is evaporated to dryness in vacuo, water is added to the residue and the undissolved moiety taken up in ether. The ether phase is then washed with a solution of sodium bicarbonate and then with water, dried over sodium sulfate and evaporated to dryness. There is so obtained an oil which crystallizes upon the addition of a small portion of petroleum ether. The so-obtained crystals of 9β,10β-desA-androstane-5,17-dione melt, after recrystallization from cyclohexane, at 77.5–78°; $[\alpha]_{589}^{25}$ +55° (c.=0.107, dioxane); R.D. in dioxane (c.=0.107%): λ in mμ ([α]-value in degrees); 550 (+70); 400 (+297); 350 (+798); 320 (+2968) max.; 300 (+467); 299 (0); 290 (−1890).

Example 90

A solution of 250 mg. of 17β-hydroxy-9β,10β-desA-androstan-5-one dissolved in 2.5 ml. of pyridine and 2.5 ml. of acetic anhydride, is left at room temperature for 18 hours. The mixture is then evaporated to dryness at 80°/11 mm., the residue taken up in ether, and the ether phase washed with 1 N hydrochloric acid, sodium bicarbonate and water, and then dried over sodium sulfate. After filtration and evaporation of the ether, the residue is then treated with a small quantity of petroleum ether yielding crystals of 17β - acetoxy - 9β,10β-desA-androstan-5-one which, upon recrystallization from methanol, melt at 118–119°; $[\alpha]_{589}^{25}$=−28° (c.=0.103%, dioxane); R.D. in dioxane (c.=0.103%): λ in mμ ([α]-value in degrees); 400 (−30); 356 (0); 350 (+10); 313 (+449) max.; 307 (+374) min.; 305 (+380) max.; 300 (+224); 293 (0); 280 (−652).

Example 91

A solution of 250 mg. of 17β - acetoxy - 9β,10β-desA-androstan-5-one in 60 ml. of 95 percent methanol containing 144 mg. of potassium hydroxide is refluxed for 60 minutes. The resulting mixture is evaporated to dryness in vacuo, water added to the residue and the suspension extracted with ether. The ether phase is washed with water, dried over sodium sulfate, filtered off, the solvent removed and the crystalline residue then crystallized from a small volume of cyclohexane, yielding crystals of 17β-hydroxy-9β,10β-desA-androstan-5-one which upon being recrystallized from ethylacetate melt at 144.5–145°; $[\alpha]_{589}^{25}$=−22° (c.=0.103, dioxane), R.D. in dioxane (c.=0.103); λ in mμ ([α]-value in degrees); 400 (−7); 390 (0); 350 (+52); 313 (+571) max.; 307 (+492) min.; 305 (+504) max.; 300 (+324); 293 (0); 290 (−202).

Example 92

The compound 11β - formyloxy-10ζ-desA - androstane-5,17-dione is prepared from 11β-formyloxy-androsta-1,4-diene-3,17-dione by ozonolysis followed by decarboxylation according to the procedure of Example 77. The so-obtained product melts at 117–117.5°; $[\alpha]_D^{25}$ +93°

(dioxane). The starting material is prepared by dissolving 11β-hydroxy-androsta-1,4-diene-3,17-dione in an excess of formic acid, and after one hour at room temperature, pouring the reaction mixture on ice, then extracting in ether, drying the ether extract and evaporating. The product is then obtained by crystallization.

Example 93

By hydrolysis of 11β-formyloxy - 10ζ-desA-androstane-5,17-dione in 2% methanolic potassium hydroxide there is obtained 11β-hydroxy-10ζ-desA-androstan-5,17-dione, which melts at 154°; $[\alpha]_D^{25}$ +96° (dioxane).

Example 94

250 mg. of 11β-hydroxy-10ζ-desA-androstane-5,17-dione and 250 mg. of p-toluene sulfonic acid monohydrate in 20 ml. of benzene were refluxed in a nitrogen atmosphere for 6 hours. The reaction mixture was then washed with an aqueous solution of sodium bicarbonate and then with water, dried over sodium sulfate, filtered and evaporated to dryness. The residue was then chromatographed over silicagel (5 g.) in dichloromethane. Triturating the residue obtained from the first 250 ml. eluted, yielded crystals of desA-androst-9-ene-5,17-dione, which upon recrystallization from cyclohexane melted at 123–123.5°.

Example 95

The compound, 11β-formyloxy-5,17-dioxo-3,5-seco-A-norandrostan-3-oic acid is prepared from 11β-formyloxy-androst-4-ene-3,17-dione by ozonolysis according to the procedure of Example 11. The so-obtained product melts at 220–221°; $[\alpha]_D^{25}$ +107° (dioxane).

Example 96

3.7 g. of the sodium salt of 11β-formyloxy-5,17-dioxo-3,5-seco-A-nor-androstan-3-oic acid and 12 g. of sodium phenylacetate are fused together in vacuo (0.1 torr). When the bath temperature reaches 220° the molten mass begins to decompose. The bath is then heated further (within 30 minutes) to a temperature of 290°. Once this temperature has been reached the mixture is left for another 10 minutes at the initial pressure of 0.1 torr. The distilled material is then chromatographed over 30 g. of aluminum oxide (activity grade 3). Elution with a total of 200 ml. of petroleum ether-benzene (2:13, followed by evaporation of the solvent and trituration of the residue in the presence of petroleum ether, yields desA-androst-9-ene-3,17-dione which upon recrystallization from cyclohexane melts at 123–123.5°; $[\alpha]_D^{25}$ +83° (c.=0.1021, dioxane).

Example 97

20β-acetoxy-5-oxo - 3,5-seco-A-nor-pregnan-3-oic acid is prepared by ozonolysis of 20β-acetoxy-pregn-4-en-3-one according to the procedure of Example 1.

Example 98

20β-hydroxy-10α-desA-pregnan-5-one and 20β-hydroxy-10β-desA-pregnan-5-one are prepared from 20β-hydroxy-5-oxo-3,5-seco-A-nor-pregnan-3-oic acid by conversion of the latter to its sodium salt followed by pyrolysis, according to the procedure of Example 2.

Example 99

20β - hydroxy-desA-pregn-9-en-5-one is prepared from 20β-hydroxy-10α-desA-pregnan-5-one by bromination followed by dehydrobromination, according to the precedure of Example 3. The so-obtained product, after recrystallization from methylene chloride-petroleum ether, melts at 122–123°.

Example 100

5,20 - dioxo - 3,5-seco-A-nor-pregnan-3-oic acid is prepared by ozonolysis of progesterone according to the procedure of Example 1.

Example 101

10α-desA-pregna-5,20-dione and 10β-desA-pregnan-5,20-dione are prepared from 5,20-dioxo-3,5-seco-A-nor-pregnan-3-oic acid by conversion of the latter to its sodium salt followed by pyrolysis, according to the procedure of Example 2.

Example 102

The compound, desA-pregn - 9-ene-5,20-dione is prepared from 10α - desA-pregna-5,20-dione by bromination followed by dehydrobromination according to the procedure of Example 3. The so-obtained product, after recrystallization from ether, melts at 111–113°.

We claim:
1. A compound selected from the group consisting of compounds of the formula

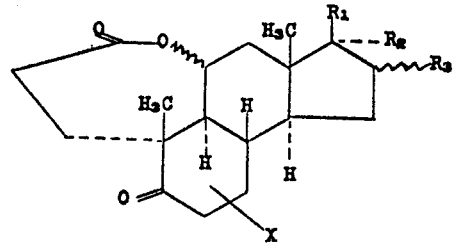

wherein R₁ is, individually, selected from the group consisting of hydroxy and lower alkanoyloxy; R₂ is, individually, lower alkyl and R₁ and R₂, taken together, are selected from the group consisting of (17β-OH, 17-lower alkanoic acid lactone), and lower alkylenedioxy; R₃ is selected from the group consisting of hydrogen, lower alkyl, hydroxy, and lower alkanoyloxy; and X is a substituent in the 6- or 7-position selected from the group consisting of hydrogen, lower alkyl, lower alkylthio, lower alkanoylthio and halogen.

References Cited

Caspi. et al., Joural of Organic Chemistry, vol. 26, 1961, pp. 3894–3898.

"Beilstein," Band 1, vol. 1 (1918) p. 681.

NICHOLAS S. RIZZO, *Primary Examiner.*

J. H. TURNIPSEED, *Assistant Examiner.*